(12) United States Patent
Murayama et al.

(10) Patent No.: US 9,543,775 B2
(45) Date of Patent: Jan. 10, 2017

(54) BATTERY CONTROLLER, MANAGEMENT SYSTEM, BATTERY CONTROL METHOD, BATTERY CONTROL PROGRAM, AND STORAGE MEDIUM

(71) Applicant: Kabushiki Kaisha Toshiba, Minato-ku (JP)

(72) Inventors: Dai Murayama, Musashino (JP); Masaaki Saito, Itabashi (JP); Nagako Hisada, Koganei (JP); Yutaka Iino, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 117 days.

(21) Appl. No.: 14/380,516

(22) PCT Filed: Jun. 26, 2014

(86) PCT No.: PCT/JP2014/067005
§ 371 (c)(1),
(2) Date: Aug. 22, 2014

(87) PCT Pub. No.: WO2015/037307
PCT Pub. Date: Mar. 19, 2015

(65) Prior Publication Data
US 2015/0295423 A1   Oct. 15, 2015

(30) Foreign Application Priority Data
Sep. 11, 2013  (JP) .................. 2013-188538

(51) Int. Cl.
*H02J 7/00*   (2006.01)
*H02J 3/00*   (2006.01)
(Continued)

(52) U.S. Cl.
CPC .................. *H02J 7/007* (2013.01); *H02J 3/00* (2013.01); *H02J 3/38* (2013.01); *H02J 3/46* (2013.01); *H02J 7/00* (2013.01); *H02J 7/04* (2013.01)

(58) Field of Classification Search
CPC .............. H01M 10/486; H01M 16/006; H01M 8/04597; H01M 8/04626; H01M 8/04753; H02J 3/00; H02J 3/38; H02J 3/46; H02J 7/00; H02J 7/0068; H02J 7/007; H02J 7/04; H02J 7/34; Y02E 60/50; Y10S 429/90
See application file for complete search history.

(56) References Cited

U.S. PATENT DOCUMENTS 6,670,063 B1* 12/2003 Aoyagi ............. H01M 8/04597
                                                    323/305
2005/0024905 A1* 2/2005 Shiojima ................. H02J 9/061
                                                    363/110
(Continued)

FOREIGN PATENT DOCUMENTS

CN   102163305 A   8/2011
CN   102891496 A   1/2013
(Continued)

OTHER PUBLICATIONS

International Search Report issued Aug. 5, 2014 in PCT/JP2014/067005 with English Translation.
(Continued)

*Primary Examiner* — Vuthe Siek
(74) *Attorney, Agent, or Firm* — Oblon, McClelland, Maier & Neustadt, L.L.P.

(57) ABSTRACT

A battery controller has a holder, a calculator, an acquirer, a calculator, and a controller. The holder holds, at a predetermined time, a value of a received power supplied from an electrical power receiving system to equipment supplied with power from a rechargeable battery. A calculator calculates a difference between a present value of the received power and a last-held value of the received power last-held by the holder at the predetermined time. An acquirer acquires a command value of the received power for each
(Continued)

predetermined time period defined by a predetermined time interval. A calculator calculates a limit value of the received power for each time that is shorter than the predetermined time, based on the command value of the received power for each predetermined time period. A controller controls charge and discharge in the rechargeable battery, based on the calculated difference and on the limit value.

9 Claims, 15 Drawing Sheets

(51) Int. Cl.
*H02J 3/38* (2006.01)
*H02J 3/46* (2006.01)
*H02J 7/04* (2006.01)

(56) References Cited

U.S. PATENT DOCUMENTS

| | | | |
|---|---|---|---|
| 2013/0002026 A1* | 1/2013 | Mizutani | H02J 7/0054 307/65 |
| 2014/0094980 A1 | 4/2014 | Saito et al. | |
| 2014/0163757 A1 | 6/2014 | Murayama et al. | |
| 2014/0188295 A1 | 7/2014 | Saito et al. | |
| 2015/0019036 A1 | 1/2015 | Murayama et al. | |
| 2015/0253795 A1 | 9/2015 | Saito et al. | |
| 2015/0323921 A1 | 11/2015 | Saito et al. | |

FOREIGN PATENT DOCUMENTS

| | | |
|---|---|---|
| JP | 4396557 | 1/2010 |
| JP | 2014-96946 A | 5/2014 |
| JP | 2015-12783 A | 1/2015 |
| JP | 2015-18374 A | 1/2015 |
| JP | 2015-56104 A | 3/2015 |
| JP | 2015-228128 A | 12/2015 |
| JP | 2016-8725 A | 1/2016 |
| WO | WO 2012/014731 A1 | 2/2012 |
| WO | WO 2012/029901 A1 | 3/2012 |

OTHER PUBLICATIONS

Combined Chinese Office Action and Search Report issued Aug. 18, 2016 in Patent Application No. 201480001864.3 (with partial English translation).

* cited by examiner

BATTERY CONTROLLER, MANAGEMENT SYSTEM, BATTERY CONTROL METHOD, BATTERY CONTROL PROGRAM, AND STORAGE MEDIUM

TECHNICAL FIELD

Embodiments of the present invention relates to a battery controller, a management system, a battery control method, a battery control program, and a storage medium.

BACKGROUND ART

Of the electrical energy consumed in facilities such as buildings, it is said that the consumed amount thereof in the private business sector such as commercial facilities accounts for approximately 20% of all facilities, a non-negligible amount of energy. With the tight supply-and-demand situation in recent years, there are cases in which large-scale consumers of electric power are subjected to upper limitations on the demand for received power amount (received electric power amount) to equipment (power consumer equipment), by reductions of power supplied during peak demand hours along and an increased demand to shift the peak-time by making use of heat-accumulators.

With the foregoing as a backdrop, the adoption of PV (photovoltaic), wind power, and solar heat equipment and the like is expected to accelerate even further in the future and, additionally, in order to achieve efficient operation of this type of equipment, the output of which is unstable, it is expected that the importance of electrical storage batteries and heat accumulators and the like that can control supply of electric power to the equipment further increases.

In this manner, in order to achieve a good linkage between diverse equipment that consumes electrical energy and to minimize operating costs and the like, a method to establish the operating schedule of this equipment has become necessary. In conventional establishment of operating schedules, the object has been to save energy and cost in equipment in a building, factory, or the like. There is, for example, a ventilation system having an object of reducing the amount of electrical energy consumption or running cost of ventilation equipment.

PRIOR ART REFERENCES

Patent References

[Patent Reference 1] Japanese Patent No. 4396557

SUMMARY OF THE INVENTION

Problem to be Solved by the Invention

There is a rechargeable battery as a device to store electrical energy to be consumed by various equipment. A battery controller, based on a demand response (DR) signal, controls charging and discharging of the rechargeable battery. The battery controller can control the electric power from the rechargeable battery to the equipment (power consumer equipment). There are cases in which the battery controller, at or above a command value of received power amount included in the demand response signal, cannot efficiently control the power supplied to the equipment.

The problem to be solved by the present invention is to provide a battery controller, a management system, a battery control method, a battery control program, and a storage medium capable of efficiently controlling the electric power supplied to equipment at or above the command value of the received power amount based on a demand response signal.

Means for Solving the Problem

A battery controller of an embodiment has a holder, a calculator, an acquirer, a calculator, and a controller. The holder holds, at a predetermined time, a value of an amount of a received power, the received power having been supplied from an electrical power receiving system to equipment that is to be supplied with a power from a rechargeable battery. A calculator calculates a difference between a present value of the amount of the received power supplied from the electrical power system to equipment and a last-held value of the amount of the received power last-held by the holder at the predetermined time. An acquirer acquires a command value of the amount of the received power for each predetermined time period defined by a predetermined time interval. A calculator calculates a limit value of the amount of the received power for each time that is shorter than the predetermined time, based on the command value of the amount of the received power for each predetermined time period. A controller controls charge and discharge in the rechargeable battery, based on the difference calculated by the calculator and on the limit value of the amount of the received power.

EMBODIMENTS

Embodiments of the battery controller, management system, charge and discharge control method, charge and discharge control program, and storage medium will be described in below, with references being made to the drawings.

First Embodiment

The battery controller controls charging and discharging of a rechargeable battery, based on a demand response (DR) signal, thereby enabling control of the electric power supplied to the controlled equipment from the rechargeable battery.

Figure 1:
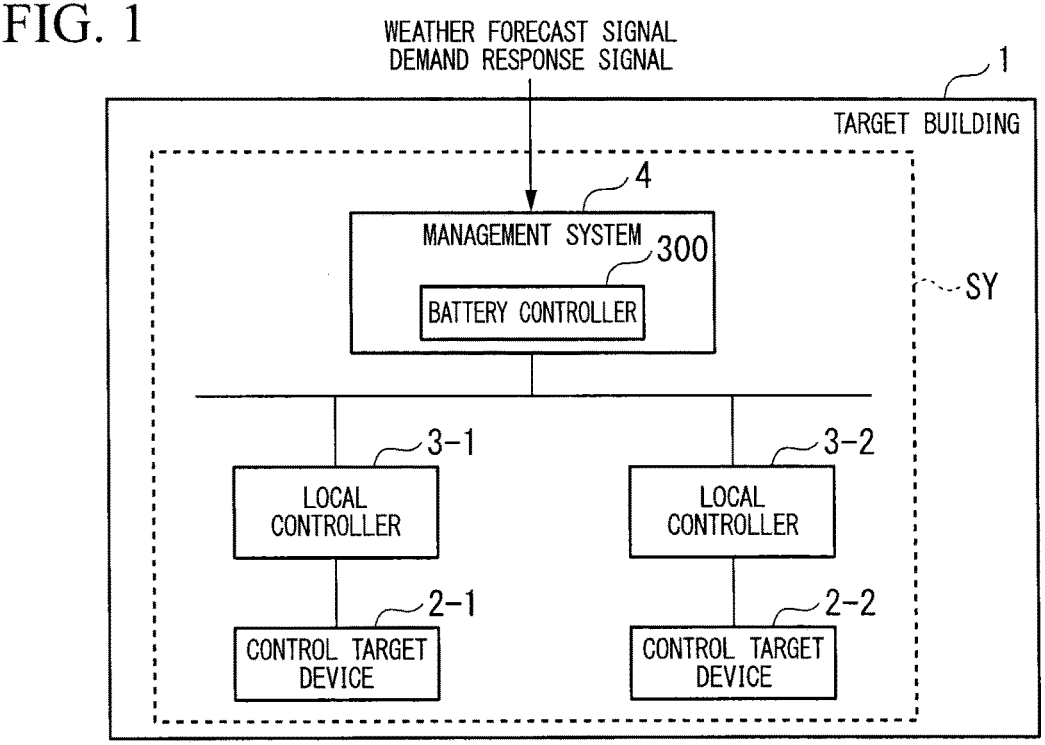
FIG. 1 shows a control system of a first embodiment.

FIG. 1 shows a control system SY. The control system SY may be provided in the target building 1, or may be provided in a predetermined location outside the target building 1. The control system SY may be provided with distributed functional blocks. In the following, the description will continue as an example the control system SY being provided in the target building 1.

The control system SY has a control target device 2, a local controller 3, and a management system 4. There may be a plurality of control target devices 2. That is, the control system SY may have control target devices 2-1 to 2-n (where n is an integer of 2 or greater). The control system SY has the local controller 3, and may also have a plurality of local controllers 3. That is, the control system SY may have a local controller 3 for each control target device 2.

The power supplied to the control target device 2 is controlled, so as to control the received power amount (amount of received electric power). The control target device 2 has an energy-consuming device, an energy-producing device, and an energy-storing device. The energy-consuming device is, for example, a heat-source device. The energy-producing device is, for example, a photovoltaic (PV) device. The energy-storing device is, for example, a rechargeable battery.

The local controller 3, based on control by the management system 4, controls the power supplied to the control target device 2. That is, the local controller 3, based on control by the management system 4, controls the amount of received power supplied to the control target device 2.

The management system 4 includes a battery controller 300. The battery controller 300 is, for example, a server. The management system 4 inputs a demand response signal. The demand response signal may include electric power peak-shift target information and electric power suppression command information. The management system 4, based on a demand response signal, outputs an operating schedule (start/stop schedule) of the control target device 2. The management system 4 inputs a weather forecast signal. Based on the weather forecast signal, the management system 4 outputs an operating schedule (start/stop schedule) of the control target device 2. The operating schedule of the control target device 2 may include an operating schedule (electrical charge and discharge and heat accumulation schedule) of a rechargeable battery and heat accumulator.

Figure 2:
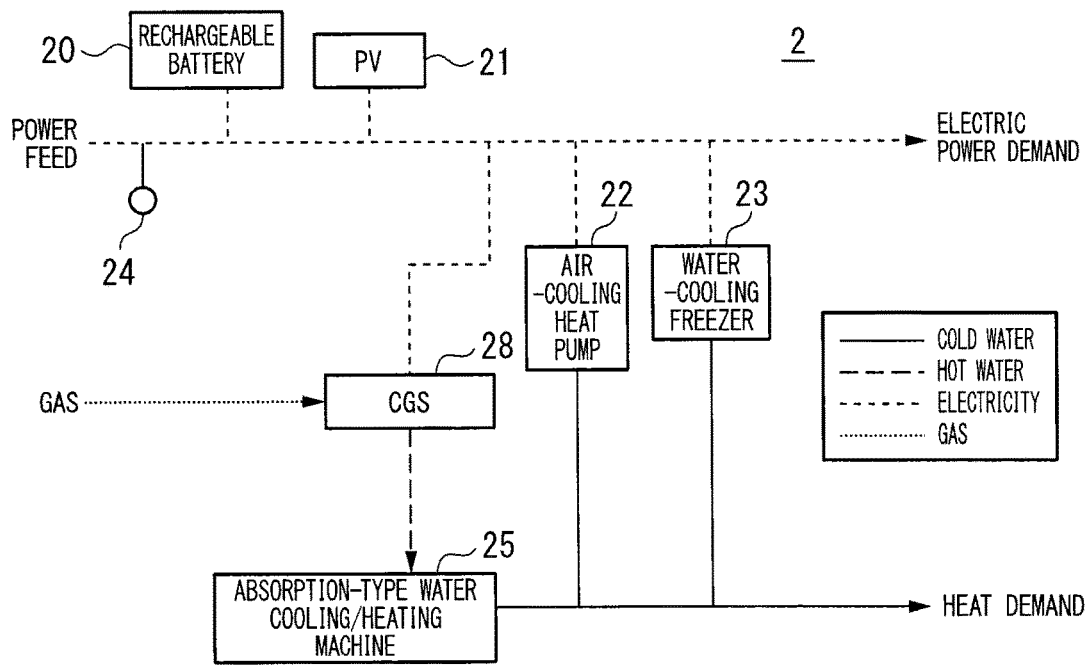
FIG. 2 shows equipment controlled by the first embodiment.

FIG. 2 shows the control target device 2. The control target device 2 has a rechargeable battery 20, a PV device 21 (photovoltaic generation system), an air-cooling heat pump 22, a water-cooling freezer 23, a received power meter 24, an absorption-type water cooling/heating machine 25, and a CGS 28 (co-generation system). The control target device 2 may further have a solar water heater.

FIG. 2 shows the energy exchange in the control target device 2. With received power (electric power) and gas as the energy source, the control target device 2 supplies electric power to the power-demanding system (energy-consuming devices) in the target building 1. Electric power supplied from the electrical power system is supplied to the power-demanding system in the target building 1. The electric power from the electrical power system may charge the rechargeable battery 20. With received power (electric power) and gas as the energy source, the control target device 2 supplies heating and cooling to a heat-demanding system in the target building 1.

The electric power generated by the PV device 21 is supplied to the power-demanding system. The electric power generated by the PV device 21 may charge the rechargeable battery 20.

The electric power generated by the co-generation system 28 is supplied to the power-demanding system. The electric power generated by the CGS 28 may charge the rechargeable battery 20.

A part of the electric power supplied to the power-demanding system is consumed in production of heating and cooling by the air-cooling heat pump 22 and the water-cooling freezer 23.

The received power meter 24 detects the received power amount supplied to the control target device 2 from the electrical power system over a predetermined time by accumulating a value of electric power supplied to the control target device 2 from the electrical power system over a predetermined time.

The CGS 28 generates heat by gas supplied from a gas system. The CGS 28 may generate electric power by gas supplied from the gas system.

The absorption-type water cooling/heating machine 25 produces cooling and heating using heat (heated water) supplied from the CGS 28.

The air-cooling heat pump 22 supplies to the heat-demanding system of the target building 1 the heating and cooling produced by the water-cooling freezer 23 and the absorption-type water cooling/heating machine 25.

Figure 3:
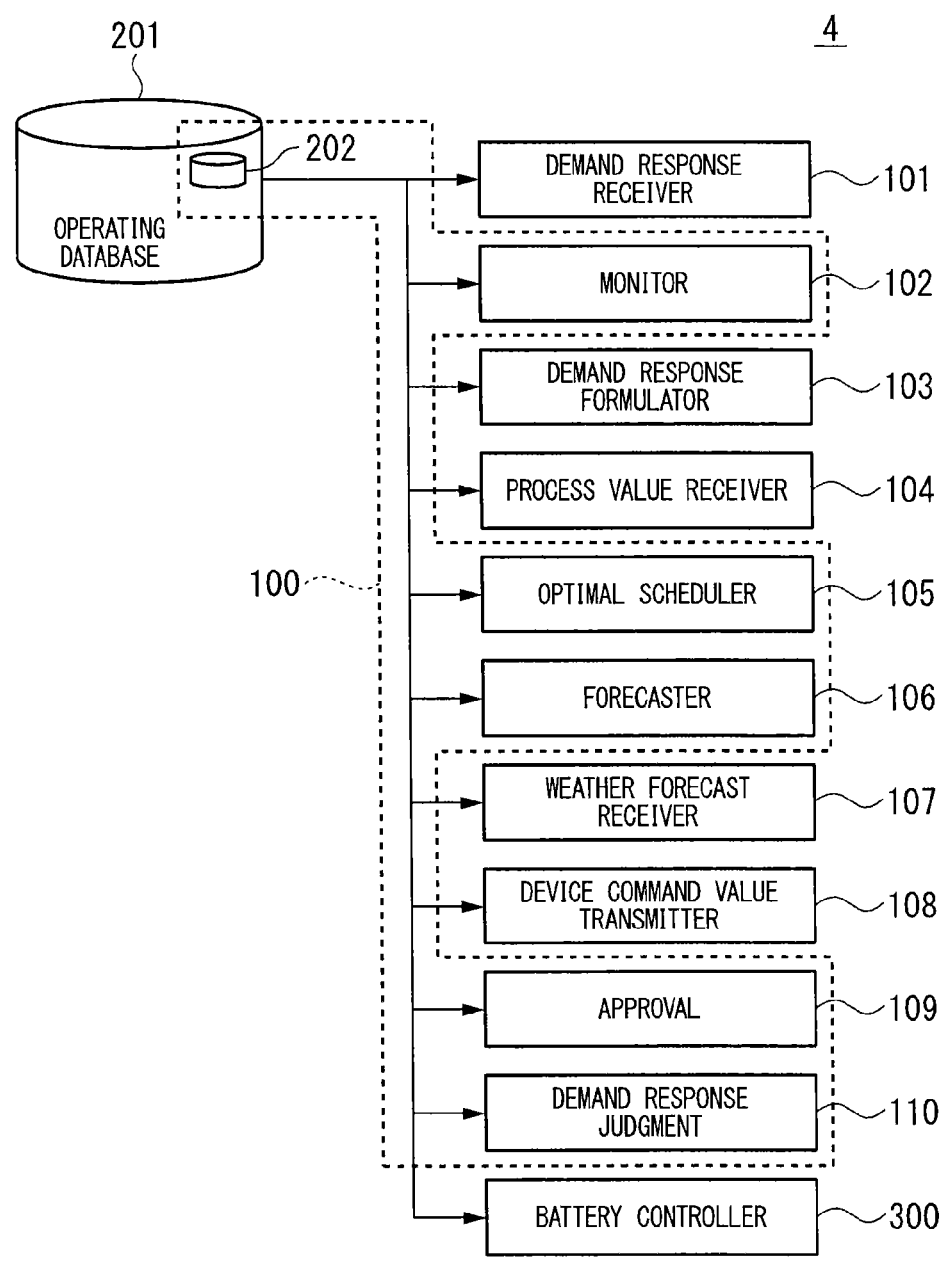
FIG. 3 shows a management system of the first embodiment.

FIG. 3 shows the management system 4. The management system 4 has a demand response receiver 101, a monitor 102, a demand response formulator 103, a process value receiver 104, an optimal scheduler 105, a forecaster 106, a weather forecast receiver 107, a device command value transmitter 108, an approval 109, a demand response judgment 110, an operating database 201, and the battery controller 300.

The operating database 201 stores command values (planned values) of the received power amount, based on the demand response signal. The operating database 201 has a database 202. The database 202 has a demand operating schedule database 202a and a DR operating schedule database 202b.

In the following, the monitor 102, the optimal scheduler 105, the forecaster 106, the approval 109, the demand response judgment 110, and the database 202 are collectively referred to as the "demand response handling type optimal operation unit 100."

Figure 4:
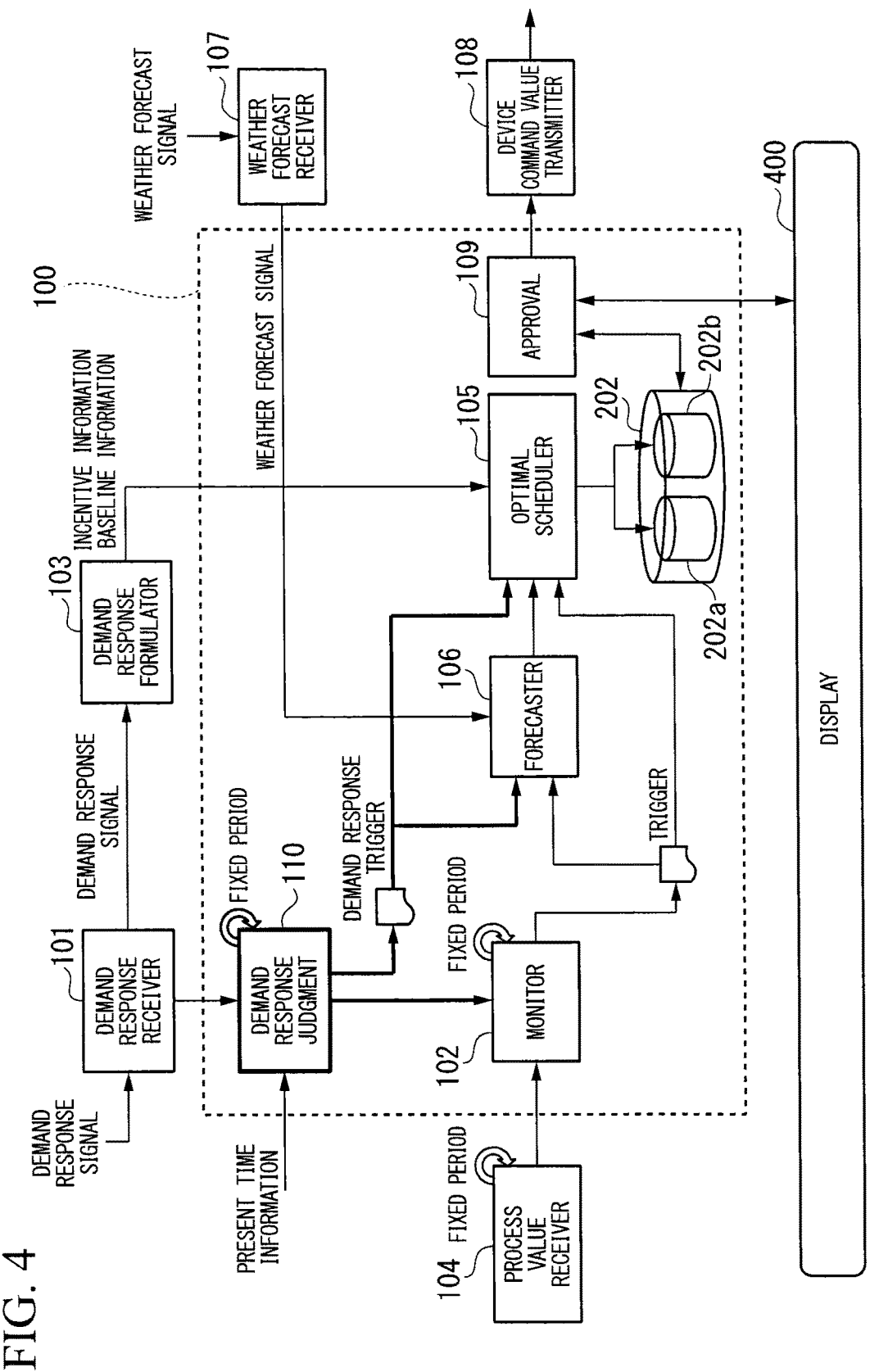
FIG. 4 shows a management system of the first embodiment.

FIG. 4 shows the management system 4. The demand response receiver 101 receives a demand response signal and transfers the received demand response signal to the demand response judgment 110 and the demand response formulator 103.

The demand response formulator 103 generates a formula of the demand response signal transferred from the demand response receiver 101. The demand response formulator 103, based on an equation that indicates a formulated demand response signal, transfers to the optimal scheduler 105 incentive information and baseline information. In this case, baseline information indicates command values (planned values) of received power amount in a predetermined time period, and incentive information indicates an incentive (for example, amount to be received) paid to consumers with respect to an amount of reduction from a baseline received power amount over a predetermined period of time.

The demand response judgment 110 inputs the present time information. The demand response judgment 110 also inputs the demand response signal from the demand response receiver 101. If the demand response signal is input thereto, the demand response judgment 110 periodically judges, based on the present time, whether or not an operation corresponding to the demand response is to be done.

In the following, a time period for executing the operation corresponding to the demand response will be referred to as the "demand respond time period (DR time period)." If the demand response judgment 110 judges that an operation correspond to the demand response is to be done, it outputs a demand response trigger signal to the monitor 102, the optimal scheduler 105, and the forecaster 106.

The demand response trigger signal causes the control target device 2 to execute an operation corresponding to the demand response. More specifically, the demand response trigger signal causes the optimal scheduler 105 to generate (propose) an operating schedule (hereinafter, "DR operating schedule") corresponding to a demand response.

The process value receiver 104 periodically collects process values, that is, received power amounts supplied to the control target device 2 from the electrical power system and the power demand amount and heat demand amount over a predetermined period of time.

The monitor 102 periodically judges whether or not a monitoring trigger signal is to be output to the forecaster 106 and the optimal scheduler 105, based on process values collected by the process value receiver 104.

The weather forecast receiver 107 receives a weather forecast signal. The weather forecast signal may include, for example, information indicating the temperature forecast for each time period.

If the monitoring trigger signal is input from the monitor 102, the forecaster 106 forecasts the power demand amount and the heat demand amount of the target building 1 based on the weather forecast signal.

The optimal scheduler 105 inputs the forecast power demand amount and heat demand amount from the forecaster 106. The optimal scheduler 105 generates demand operating schedule information of the control target device 2 over a predetermined time (predetermined period of time) and stores the generated demand operating schedule information into the demand operating schedule database 202a. The demand operating schedule information may include, for example, an operating schedule (start/stop schedule) for the control target device 2 for satisfying the power demand amount and heat demand amount.

The optimal scheduler 105 inputs the demand response trigger signal from the demand response judgment 110. The optimal scheduler 105 generates information indicating the DR operating schedule of the control target device 2 over a predetermined time (predetermined time period) and stores information indicating the generated DR operating schedule into the DR operating schedule database 202b.

The approval 109 selects and approves a demand operating schedule or a DR operating schedule, based on predetermined conditions. If the approval 109 approves a demand operating schedule, it acquires information indicating the approved demand operating schedule from the demand operating schedule database 202a and transfers it to the device command value transmitter 108. The information indicating the approved demand operating schedule is transmitted as received power amount command values from the device command value transmitter 108 to the control target device 2 (for example, an energy-consuming device).

If the approval 109 approves a DR operating schedule, it acquires information indicating the approved DR operating schedule from the DR operating schedule database 202b and transfers it to the device command value transmitter 108. The information indicating the approved DR operating schedule may be transmitted as received power amount command values from the device command value transmitter 108 to the control target device 2 (for example, an energy-consuming device). The approval 109 also outputs an image signal to a display 400. The image signal indicates the approved demand operating schedule or DR operating schedule.

If information indicating a demand operating schedule is input from the approval 109, the device command value transmitter 108 transmits information indicating the demand operating schedule as received power amount command values to the control target device 2. If information indicating a DR operating schedule is input from the approval 109, the device command value transmitter 108 transmits information indicating the DR operating schedule as received power amount command values to the control target device 2.

The display 400 displays an image based on the image signal output from the approval 109. The image signal may indicate the demand operating schedule or DR operating schedule approved by the approval 109. The image based on the image signal will be described later, using FIG. 9.

Next, an example of generating a DR operating schedule will be described.

In the case in which the demand response signal is a PTR (peak-time rebate), an incentive is paid to a consumer with respect to the amount of reduction from the baseline received power amount over a predetermined period of time. In this case, the demand response signal includes electricity rates for each time period, the incentive for each time period, and the baselines for each time period.

The demand response formulator 103 generates a DR operating schedule (operating plan) for achieving energy savings, cost savings, and reduction of $CO_2$ (carbon dioxide) and the like. For example, if a DR operating schedule for achieving reduced cost is generated, the demand response formulator 103 can generate an operating schedule so that the target function C shown in Equation (1) is minimized.

$$C = \Sigma \{k_i \times L_i - m_i \times (L_i - B_i) + n_i \times P_i\} \quad (1)$$

In the above, C indicates the cost during an operating period, i indicates a time period with the 24 hours of a day divided into equal parts, and indicates any one of values from 0 to 24 in accordance with the elapsed time from 0000. Also, $k_i$ indicates the electricity rate (received power unit price) in the time period i, $L_i$ is the received power amount in the time period i, $m_i$ is the incentive (amount of money or the like) in the time period i, $B_i$ is the baseline in the time period i, $n_i$ is the gas rate in the time period i, and $P_i$ is the gas consumption amount in the time period i.

The reducible amount $L_i$ in the received power amount is represented by Equation (2).

$$L_i = S_i + D_i \quad (2)$$

In the above, $S_i$ is the reducible amount of received power amount for individual time periods, and $D_i$ is the received power amount in individual time periods.

The optimal scheduler 105 solves the optimization problem to minimum the target function C expressed by Equation (1). Various methods may be used to solve this optimization problem. For example, the optimal scheduler 105 may solve the optimization problem by calculating the received power amount $D_i$ for each time period, based on the power demand amount and the heat demand amount forecast based on the weather forecast signal.

Next, the battery controller 300 (refer to FIG. 3) will be described.

Figure 5:
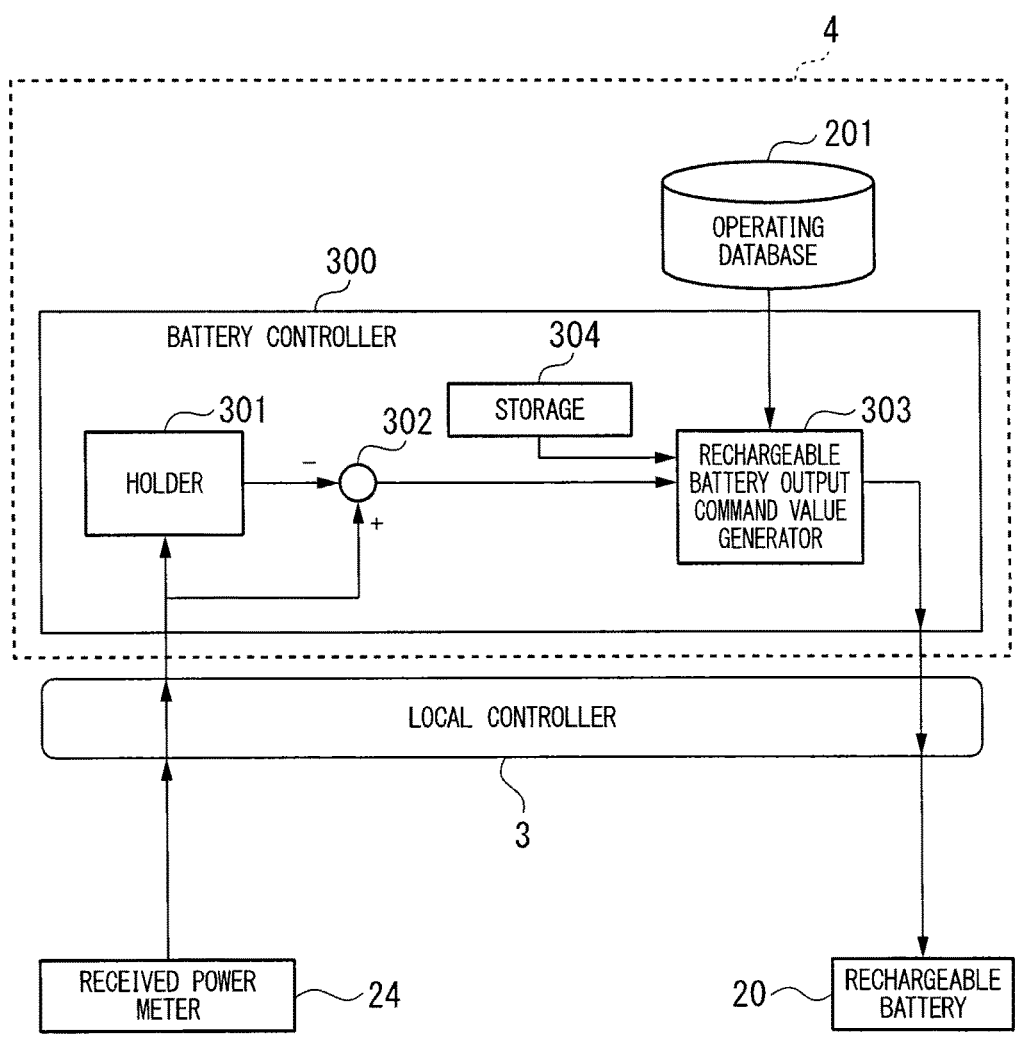
FIG. 5 shows a battery controller of the first embodiment.

FIG. 5 shows the battery controller 300. The battery controller 300 has a holder 301, a calculator 302, a rechargeable battery output command value generator 303, and a storage 304. The storage 304 can be constituted by a non-transitory storage medium. The storage 304 may be provided, as shown in FIG. 5, within the battery controller 300. The storage 304 may also be provided outside the battery controller 300. All or part of the holder 301, the calculator 302, and the rechargeable battery output command value generator 303 are a software functional parts functioning by the execution of a program stored in the storage 304 by a processor such as the CPU (Central processing unit). All or part of these functional parts may be hardware, such as LSI (large-scale integration) devices or ASICs (application-specific integrated circuits).

The holder 301 receives the received amount of power (present value) supplied to the control target device 2 from the electrical power system during a predetermined period of time from the received power meter 24 via the local controller 3 (communication system). In the following, the time at which the command value of received power amount based on the demand response signal is established will be referred to as "holding time." The holding time is, for example, every 0 minutes and 30 minutes after each hour.

If the present time is the holding time (0 or 30 minutes after each hour), the holder 301 holds the received power amount (present value) supplied to the control target device 2 from the electrical power system during the predetermined time period. That is, each time the present time reaches the holding time (0 or 30 minutes after each hour), the holder 301 updates the held received power amount. The holder 301 outputs the held received power amount value to the calculator 302.

The calculator 302 receives the received power amount (present value) supplied to the control target device 2 from the electrical power system in the predetermined period of time from the received power meter 24, via the local controller 3 (communication system). The calculator 302 subtracts the received power amount held by the holder 301 from the received power amount (present value) supplied to the control target device 2 from the electrical power system during the predetermined period of time. That is, the result of this subtraction indicates the received power amount supplied to the control target device 2 from the electrical power system during the predetermined time period T (for example, the half-hour period from 0 to 30 minutes). The calculator 302 outputs the received power amount supplied to the control target device 2 from the electrical power system during the time period T to the storage output command value generator 303.

The rechargeable battery output command value generator 303 acquires from the operating database 201 the command value of the received power amount (planned value), based on the demand response signal. That is, the rechargeable battery output command value generator 303 acquires from the operating database 201 the command value of the received power amount supplied from the rechargeable battery 20 to the energy-consuming device every predetermined time period.

The rechargeable battery output command value generator 303 acquires from the calculator 302 the received power amount supplied to the control target device 2 from the electrical power system during the time period T. The rechargeable battery output command value generator 303, based on the command value of the received power amount supplied to the control target device 2 from the electrical power system during the time period T, calculates the limit value of the received power amount for each time period shorter than the time period T.

The rechargeable battery output command value generator 303 controls charge and discharge of electricity (charging and discharging) of the rechargeable battery 20 based on the limit value of the received power amount, so that the command value (planned value) of received power amount is satisfied, via the local controller 3 (communication system). More specifically, the rechargeable battery output command value generator 303 outputs a signal indicating the output value of the rechargeable battery to the rechargeable battery 20, via the local controller 3 (communication system).

If the output value of the rechargeable battery is positive, the rechargeable battery 20 discharges, based on a signal indicating the output value of the rechargeable battery. In contrast, if the output value of the rechargeable battery is negative, the rechargeable battery 20 charges, based on a signal indicating the output value of the rechargeable battery.

Figure 6:
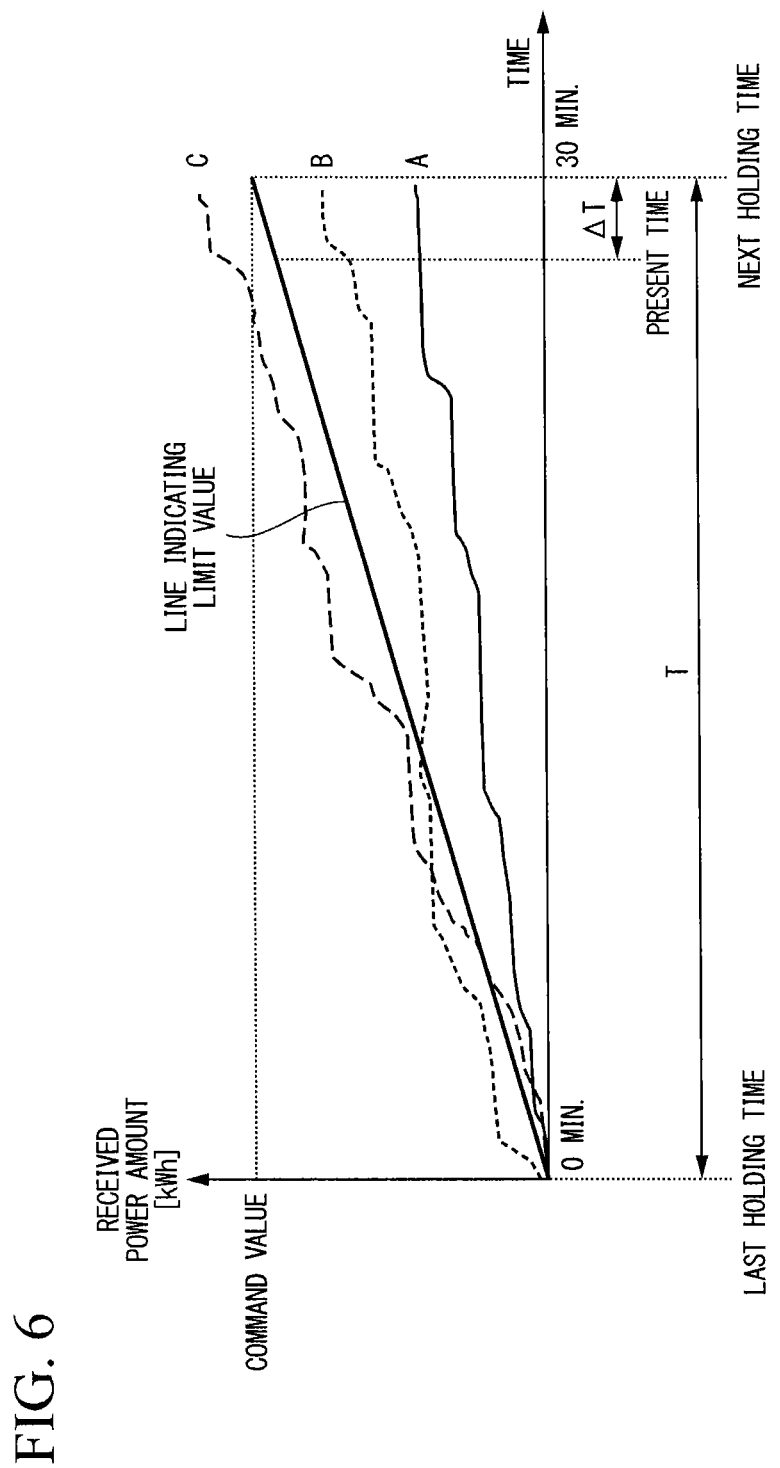
FIG. 6 shows the limit value of the received power amount in the first embodiment.

FIG. 6 shows the limit value of the received power amount. The horizontal axis represents time, and the vertical axis represents received power amount in kilowatts. The limit value of the received power amount at the present time is expressed by the Equation (3).

$$\text{Limit value of received power amount} = (T-\Delta T)/T \times (\text{command value of received power amount}) \quad (3)$$

In the above, T is the interval (predetermined time) of the holding time that is predetermined, and the example that will be described uses 0.5 hour (=30 minutes) and $\Delta T$ is the time remaining from the present time until the holding the time (30 minutes after each hour). Therefore, "T−ΔT" is the time from the last holding time (0 minutes after every hour) until the present time.

The output value of the rechargeable battery (battery output) is, for example, a value obtained by subtracting the received power amount supplied to the control target device 2 from the electrical power system from the last holding time up until the present time from the limit value of the received power amount at the present time. That is, the output value of the rechargeable battery is established in accordance with the span between the received power amount supplied to the control target device 2 from the electrical power system from the last holding time until the present time, relative to the limit value of the received power amount at the present time.

In FIG. 6, the limit value (kWh) of the received power amount is established so that it increases linearly with the elapse of time. Also, the received power amount (kWh) supplied to the control target device 2 from the electrical power system from the last holding time up until the present time varies as shown by the patterns A, B, and C, respectively. In the pattern A, the received power amount supplied to the control target device 2 from the electrical power system is always lower than the limit value of the received power amount. In pattern B, the received power amount supplied to the control target device 2 from the electrical power system is at first in excess of the limit value of the received power amount, but subsequently falls below the limit value of the received power amount. In the pattern C, the received power amount supplied to the control target device 2 from the electrical power system is below the limit value of the received power amount at first, but subsequently exceeds the limit value of the received power amount.

Figure 7:
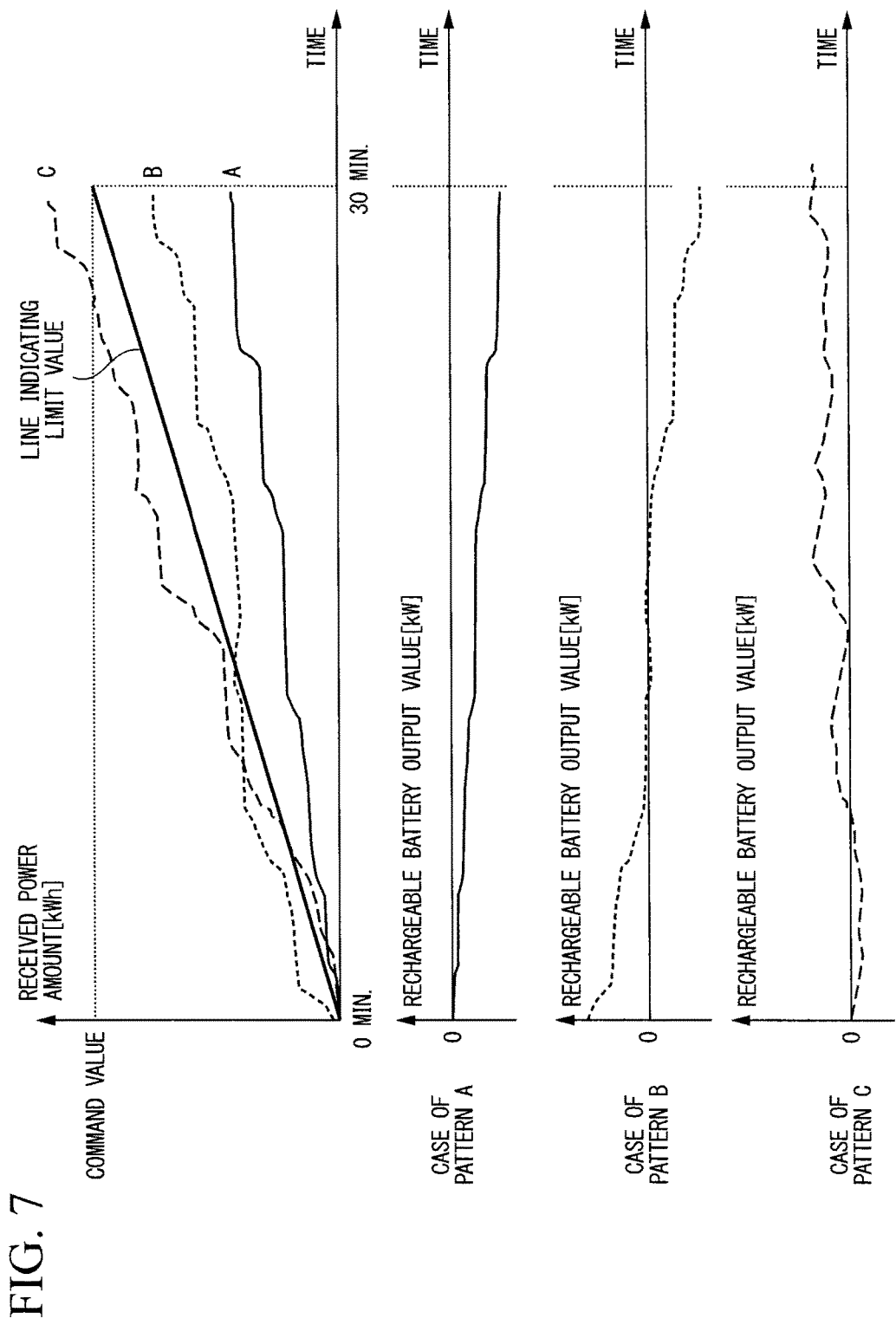
FIG. 7 shows the output of the rechargeable battery in the first embodiment.

FIG. 7 shows the output of the rechargeable battery 20. The topmost section shows a graph indicated in FIG. 6. The lower section shows graphs indicating the output value of the rechargeable battery for pattern A, pattern B, and the pattern C, respectively. In the graphs indicating the output of the rechargeable battery, the horizontal axis represents time, and the vertical axis represents the output value of the rechargeable battery (kW).

In pattern A, because the received power amount supplied to the control target device 2 from the electrical power system is always lower than the limit value of the received power amount, the output value of the rechargeable battery 20 is negative. That is, in pattern A, the rechargeable battery 20 is always charging, based on the signal indicating the output value of the rechargeable battery.

In pattern B, based on the signal indicating the output value of the rechargeable battery, the rechargeable battery 20 discharges at first, but then charges subsequently. In pattern C, based on the signal indicating the output value of the rechargeable battery, the rechargeable battery 20 charges at first, but subsequently discharges. By virtue of this type of control, in each of pattern A, pattern B, and pattern C, the received power amount supplied to the control target device 2 from the electrical power system during the time period T always coincides with the limit value of the received power amount.

FIG. 7 shows the operation over a period of one day, during the 30-minute periods from zero minutes after each hour. With regard to pattern A, pattern B, and pattern C, the cost required for charge and discharge in the rechargeable battery 20 can be calculated based on the accumulated values of charging and discharging during the 30-minute periods, that is, based on the accumulated values of the output value of the rechargeable battery 20 over the 30-minute periods. Also, charge and discharge in the rechargeable battery 20 is used in adjusting the received power amount supplied to the control target device 2 from the electrical power system. For this reason, the unit price for electricity required for charge and discharge in the rechargeable battery 20 is the same as the unit price for power received.

If the command value of the received power amount during the demand response time period is the baseline (limit value of received power amount) for calculating the incentive, the received power amount supplied to the control target device 2 from the electrical power system over the predetermined time period can be made lower than the baseline by having the rechargeable battery 20 charge, based on a signal indicating the output value of the rechargeable battery. For this reason, a consumer can receive an incentive in accordance with an operating schedule approved by the approval 109.

Next, an example of the operating procedure in the battery controller 300 will be described.

Figure 8:
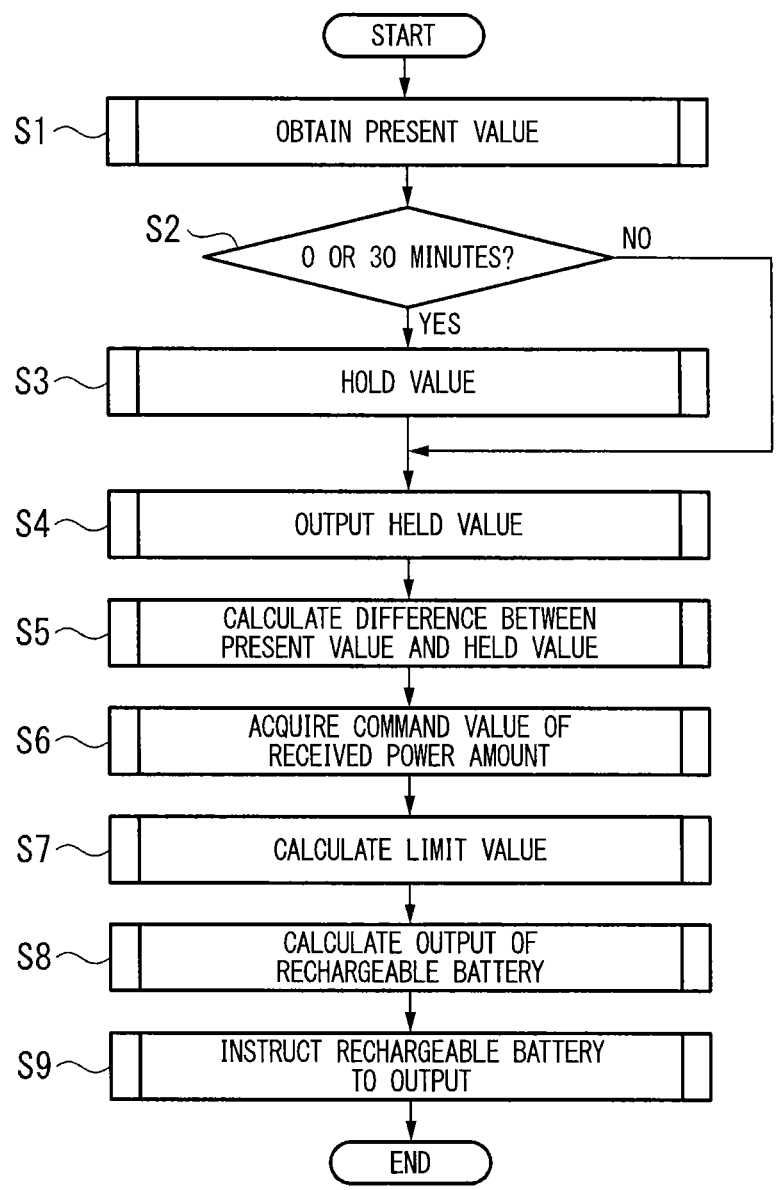
FIG. 8 is a flowchart showing the operation of the battery controller of the first embodiment.

FIG. 8 shows the operation of the battery controller 300.

(Step S1) The holder 301 receives the received power amount (present value) supplied to the control target device 2 from the electrical power system during the predetermined time period from the received power meter 24 via the local controller 3 (communication system).

(Step S2) The holder 301 judges whether or not the present time is the holding time (0 or 30 minutes after each hour). If the present time is a holding time (Yes at step S2), the holder 301 proceeds to the processing of step S3. If, however, the present time is not the holding time (No at step S2), the holder 301 proceeds to step S4.

(Step S3) The holder 301 holds the present value of the received power amount supplied to the control target device 2 from the electrical power system during the predetermined time period.

(Step S4) The holder 301 outputs to the calculator 302 the held value of received power amount (held value).

(Step S5) The calculator 302 subtracts the received power amount value held by the holder 301 from the present value of received power amount supplied to the control target device 2 from the electrical power system during the predetermined period of time. That is, the calculator 302 calculates the difference between the present value of received power amount supplied to the control target device 2 from the electrical power system during the predetermined time period and the value of received power amount stored by the holder 301.

(Step S6) The rechargeable battery output command value generator 303 obtains from the operating database 201 a command value (planned value) of the received power amount based on the demand response signal.

(Step S7) The rechargeable battery output command value generator 303, based on the received power amount supplied to the control target device 2 from the electrical power system during the time period T, calculates the limit value of the received power amount for each time period shorter than the time period T (refer to Equation (3)).

(Step S8) The rechargeable battery output command value generator 303 calculates the output value of the rechargeable battery. In this case, the output value of the rechargeable battery may be obtained by subtracting the received power amount supplied to the control target device 2 from the electrical power system from the last holding time to the present time from the limit value of the received power amount at the present time.

(Step S9) The rechargeable battery output command value generator 303 outputs a signal indicating the output value of the rechargeable battery to the rechargeable battery 20.

Figure 9:
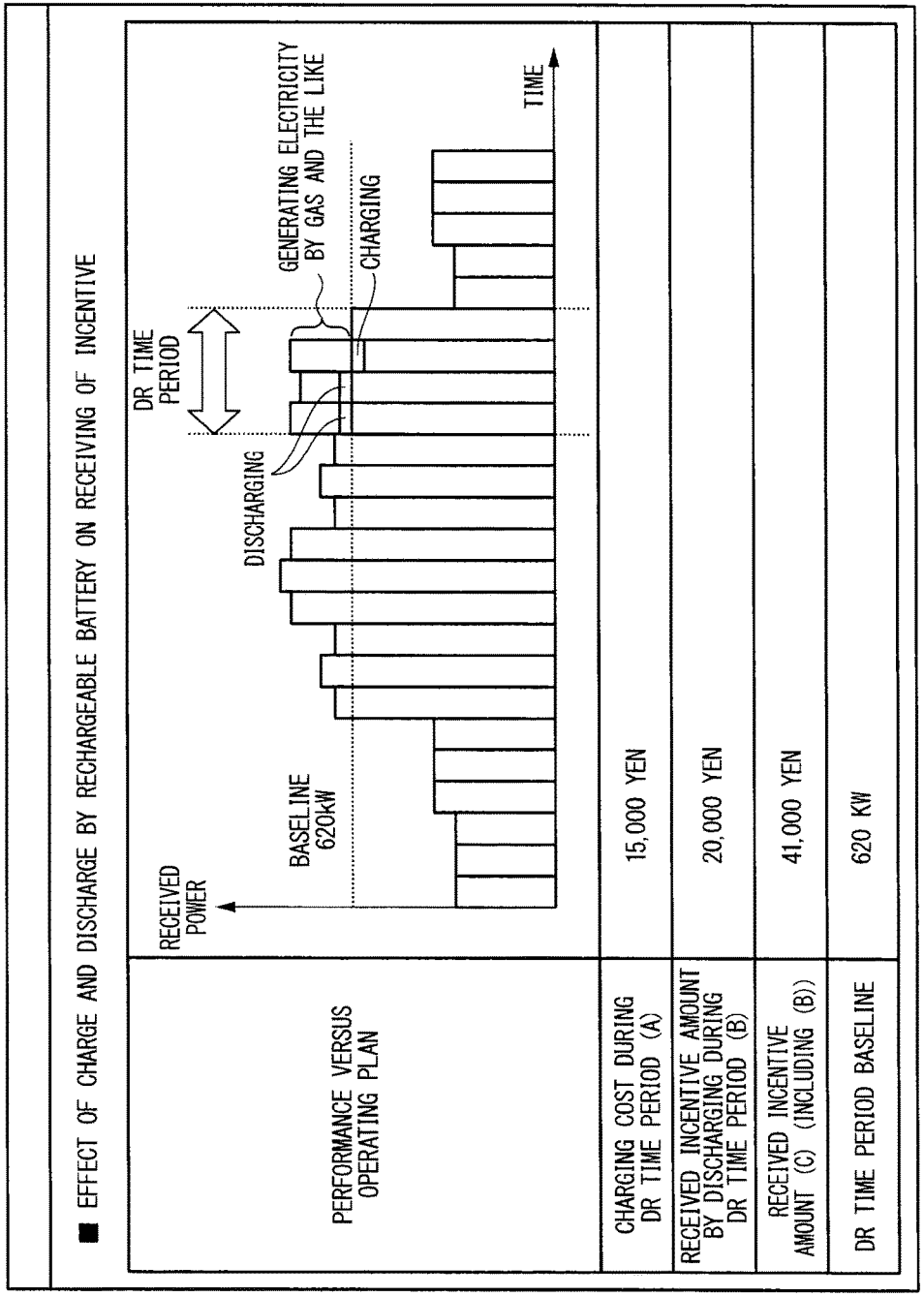
FIG. 9 shows the effect of charge and discharge of electricity by the rechargeable battery on the receiving of an incentive in the first embodiment.

FIG. 9 shows the effect of charge and discharge in the rechargeable battery 20 on receiving an incentive. More specifically, FIG. 9 is an image for verifying the operating schedule (operating plan). This image may be displayed on the display 400 based on an image signal output from the approval 109. The image for verifying the operating schedule indicates the "Performance versus operating plan", the charging cost during the DR time period, the received amount of incentive by discharging during the DR time period, the received amount of incentive, and the DR time baseline.

The item "Performance versus operating plan" indicates the trend in power demand and the trend in charge and discharge in the rechargeable battery 20 as a bar graph. In this bar graph, the horizontal axis represents time, and the vertical axis represents received power (kW). Therefore, each bar corresponds to the received power amount (electric power amount) per hour. The bar graph also indicates the received power baseline (620 kW in FIG. 9).

In FIG. 9, discharging of the rechargeable battery 20 is done at the first hour and the second hour. In the third hour of the DR time period, the rechargeable battery 20 is charged. In the fourth hour of the DR time period, the rechargeable battery 20 is neither charged nor discharged. In FIG. 9, in the first, second, and third hours of the DR time period, the CGS 28 generates electricity by the gas supplied from the gas system and generates electric power.

The item "charging cost during the DR time period" indicates that, in the third hour of the DR time period, a cost of "15,000 Yen" is required for charging the rechargeable battery 20. The item "received incentive amount by discharging during the DR time period" indicates that a received incentive amount of "20,000 Yen" can be obtained by discharging the rechargeable battery 20.

In the event that, the rechargeable battery 20 was not discharged in the first hour and second hour of the DR time period, it is not possible for the received power supplied to the control target device 2 from the electrical power system to be below the baseline, and the consumer cannot receive an incentive. In actuality, because the rechargeable battery 20 discharges based on a signal indicating the output value of the rechargeable battery in the first hour and second hour of the DR time period, it is possible for the received power supplied to the control target device 2 from the electrical power system to be below the baseline, enabling the consumer to receive an incentive.

The item "received incentive amount" indicates that an incentive of "41,000 Yen" can ultimately be obtained. The received amount of incentive that can ultimately be obtained includes the received incentive amount of "20,000 Yen" that can be obtained by discharging the rechargeable battery 20 and the received incentive amount of "21,000 Yen" that can be obtained by generating electricity by the CGS 28 or the like. The item "DR time period baseline" indicates that the baseline is "620 kW", based on the demand response signal.

As noted above, the battery controller 300 of the first embodiment has a holder (for example, the holder 301), the calculator (for example, the calculator 302), an acquirer (for example, the rechargeable battery output command value generator 303), a calculator (for example, the rechargeable battery output command value generator 303), and a controller (for example, the rechargeable battery output command value generator 303). The holder holds the value of the received power amount supplied from the electrical power system to the equipment that is supplied power from the rechargeable battery 20, at a predetermined time. The calculator calculates the difference between the present value of received power amount supplied to the equipment from the electrical power system and the value of the received power amount held in the holder at the predetermined time. The acquirer acquires a command value of the received power amount for each predetermined time period defined by a time interval that is predetermined (for example, the command value of received power amount at the time 30 minutes in FIG. 6). The calculator, based on the command value (the command value of the received power amount based on the demand response signal) of the received power amount every predetermined time (for example, 30 minutes), calculates the limit value of the received power amount for each time that is shorter than a predetermined time period. The controller controls charge and discharge of the rechargeable battery based on the difference calculated by the calculator and on the limit value of the received power amount.

The management system 4 has a battery controller battery controller (for example, the battery controller 300), and an operating database 201. The operating database 201 stores the command value (planned value) of the received power amount, based on the demand response signal.

A battery control method of the first embodiment in charge and discharge controller has a step of the holding, a step of calculating a difference, a step of acquisition, a step of calculating a limit value, and a step of controlling. In the holding step, the holder (for example, the holder 301) holds the value of the received power amount supplied from the electrical power system to the equipment supplied with power from the rechargeable battery 20 at a predetermined time. In the difference calculation step, the calculator (for example, the calculator 302) calculates the difference between the present value of the received power amount supplied to the equipment from the electrical power system and the value of the received power amount stored by the holder at a predetermined time. In the acquisition step, the acquirer (for example, the rechargeable battery output command value generator 303) acquires a command value of the received power amount for each predetermined time period defined by the predetermined time interval. In the limit value calculation step, the calculator (for example, the rechargeable battery output command value generator 303) calculates a limit value of the received power amount for each period of time shorter than a predetermined period of time, based on the command value of the received power amount for each predetermined period of time. In the control step, the controller (for example, the rechargeable battery output command value generator 303) controls the charge and discharge in the rechargeable battery 20, based on the difference calculated by the calculator and the limit value of the received power amount.

Charge and discharge control program of the first embodiment causes a computer to execute a holding procedure, a difference calculating procedure, an acquisition procedure, a limit value calculation procedure, and a control procedure. In the holding procedure, the charge and discharge control program causes the computer to execute a procedure for holding a value of the received power amount supplied from an electrical power system electrical power system to equipment supplied with power from the rechargeable battery 20, at a predetermined time. In the difference calculation procedure, the program causes the computer to execute a procedure for calculating a difference between a present value of a received power amount supplied to the equipment from the electrical power system and a value of the received power amount held at the predetermined time. In the acquisition procedure, the program causes the computer to execute a procedure for acquiring a command value of the received power amount for each predetermined time period defined by the predetermined time interval. In the limit value calculation procedure, the program causes the computer to execute a procedure for calculating a limit value of the received power amount for each time that is shorter than the predetermined time, based on the command value of the received power amount for each predetermined time period. In the control procedure, the program causes the computer to execute a procedure for controlling the charge and discharge in the rechargeable battery 20, based on the limit value of the received power amount and the calculated difference.

The storage medium is a computer-readable medium in which a charge and discharge control program is recorded.

By this configuration, the controller controls charge and discharge of the rechargeable battery, based on the difference calculated by the calculator and the control of value of the received power amount. Doing this enables the charge and discharge controller 300, the management system 4, the battery control method, the charge and discharge control program, and the storage medium of the first embodiment to control the power supplied to the equipment to a value greater than the command value of the received power amount, based on the demand response signal. The battery controller 300, the management system 4, the battery control method, the charge and discharge control program, and the storage medium of the first embodiment can achieve a cost advantage.

The rechargeable battery output command value generator 303 of the first embodiment may output to the rechargeable battery 20, via the local controller 3 (communication system) a signal indicating the output value of the rechargeable battery, based on a received power amount supplied to the control target device 2 from the electrical power system at the predetermined time (for example, from the last holding time to the present time) and a command value of the received power amount based on the demand response signal.

The rechargeable battery output command value generator 303 of the first embodiment may output to the rechargeable battery 20 a signal indicating the output value of the rechargeable battery, based on a limit value of the received power amount at the present time (for example, refer to equation (3)).

The rechargeable battery output command value generator 303 of the first embodiment may output to the rechargeable battery 20 a signal indicating the output value of the rechargeable battery, based on remaining time $\Delta T$ until the next holding time (every 30 minutes after the hour) from the present time (for example, see equation (3)).

The rechargeable battery output command value generator 303 of the first embodiment may output to the rechargeable battery 20 a signal indicating the output value of the rechargeable battery, based on the value obtained by subtracting the received power amount supplied to the control target device 2 from the electrical power system from the last holding time to the present time from the limit value of the received power amount at the present time, that is, based on the span of the received power amount with respect to the limit value (for example, refer to FIG. 7).

Second Embodiment

In the second embodiment, the discharge of the rechargeable battery 20 is executed continuously immediately before the holding time, this being different from the first embodiment. In the following, only the differences with respect to the first embodiment will be described.

The charge and discharge of the rechargeable battery 20 is used in adjusting the received power amount supplied to the control target device 2 from the electrical power system. For this reason, the required electricity unit price for charging and discharging of the rechargeable battery 20 are the same as the received electricity unit price. Therefore, there are cases in which the rechargeable battery 20 is charged by a high electricity unit price in the peak time period during the day. For example, in the first embodiment, the item "charging cost during the DR time period" indicates that the charging cost of the rechargeable battery 20 in the third hour of the DR time period is "15,000 Yen" (refer to FIG. 9). In the second embodiment, the received power meter 24, by accumulating values that indicate the power supplied to the control target device 2 from the electrical power system every predetermined time period, detects the received power amount supplied to the control target device 2 from the electrical power system for that predetermined time period. The received power meter 24 detects the amount of power flowing in the electrical power system (hereinafter referred to as the "reverse-flow power amount") from the control target device 2 for that predetermined period of time, by accumulating the values indicating the power supplied to the electrical power system from the control target device 2 for the predetermined time period. The rechargeable battery output command value generator 303 can detect the difference between the received power amount supplied to the control target device 2 from the electrical power system during that predetermined time period and the power amount flowing in reverse during that predetermined period of time.

If the rechargeable battery 20 is pre-charged during the evening, during the peak time during the day, it is possible to perform charging at an electricity unit price lower than the electricity unit price during the day. For this reason, the battery controller can reduce the charge and discharge cost during the DR time period, thereby enhancing the cost advantage. The smaller the discharge amount is made, the smaller can the capacity of the rechargeable battery 20 be made.

That is, if charging is done of the rechargeable battery 20 beforehand (for example, on the previous evening), it is not necessary to charge the rechargeable battery 20 during the DR time period, so that the battery controller can achieve a further advantage in terms of cost, compared with the first embodiment. Also, by the capacity of the rechargeable battery 20 being small, the battery controller can achieve a further cost advantage over the first embodiment.

Figure 10:
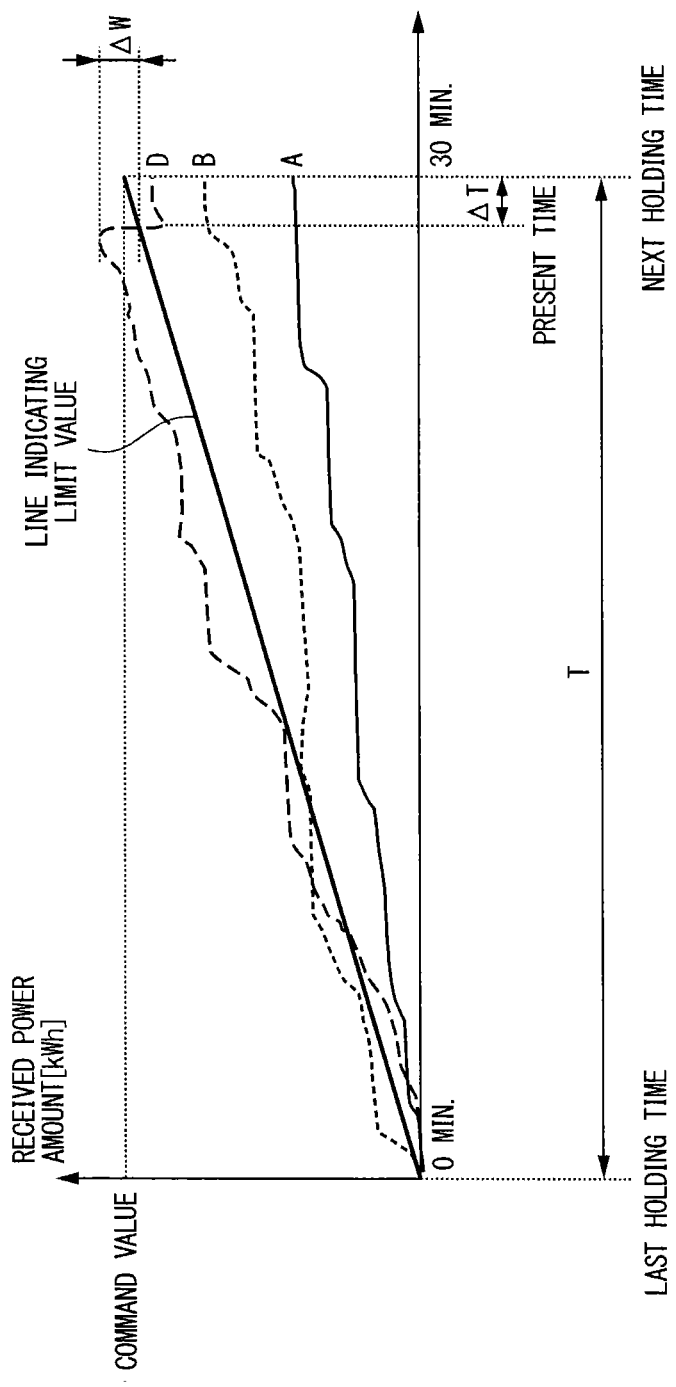
FIG. 10 shows the limit value of the received power amount in a second embodiment.

FIG. 10 shows the limit value of the received power amount. The horizontal axis represents time, and the vertical axis represents the received power amount (kWh). The received power amount (kWh) that is supplied to the control target device 2 from the electrical power system from the last holding time to the present time varies, for example, between pattern A, pattern B, and pattern D.

Pattern A and pattern B are the same as in FIG. 6. In pattern D, although the received power amount supplied to the control target device 2 from the electrical power system is in excess of the limit value of the received power amount at the beginning, after reaching the time $\Delta t$ remaining from the present time to the next holding time, it falls below the limit value of the received power amount.

This is because, after reaching the remaining time $\Delta t$ from the present time to the next holding time, that is, immediately before the next holding time, the rechargeable battery 20 is continuously discharged, based on a signal indicating the output value of the rechargeable battery.

At the present time that has reached the remaining time $\Delta T$ up until the next holding time, because the rechargeable battery 20 is discharged at the point at which the amount of excess $\Delta W$ in the received power amount relative to the limit value is reached, the rechargeable battery output command value generator 303 outputs to the rechargeable battery 20 a signal indicating the output value of the rechargeable battery, based on a function determined by the remaining time $\Delta t$ and the amount of excess $\Delta W$ in the received power amount.

The function that is determined by the remaining time $\Delta T$ and the excess amount $\Delta W$ (kWh) in the received power amount relative to the limit value is expressed by the following Equation (4), using the maximum power value X (kW) which can be output (discharged) from the rechargeable battery.

$$\Delta W/(\Delta T/T)=X \qquad (4)$$

In this case, in order to provide a margin value with respect to the maximum power value X that can be output from the rechargeable battery, a power amount α (kWh) that is predetermined may be added to the excess amount ΔW of the received power amount.

$$(\Delta W + \alpha)/(\Delta T/T) = X \quad (5)$$

Figure 11:
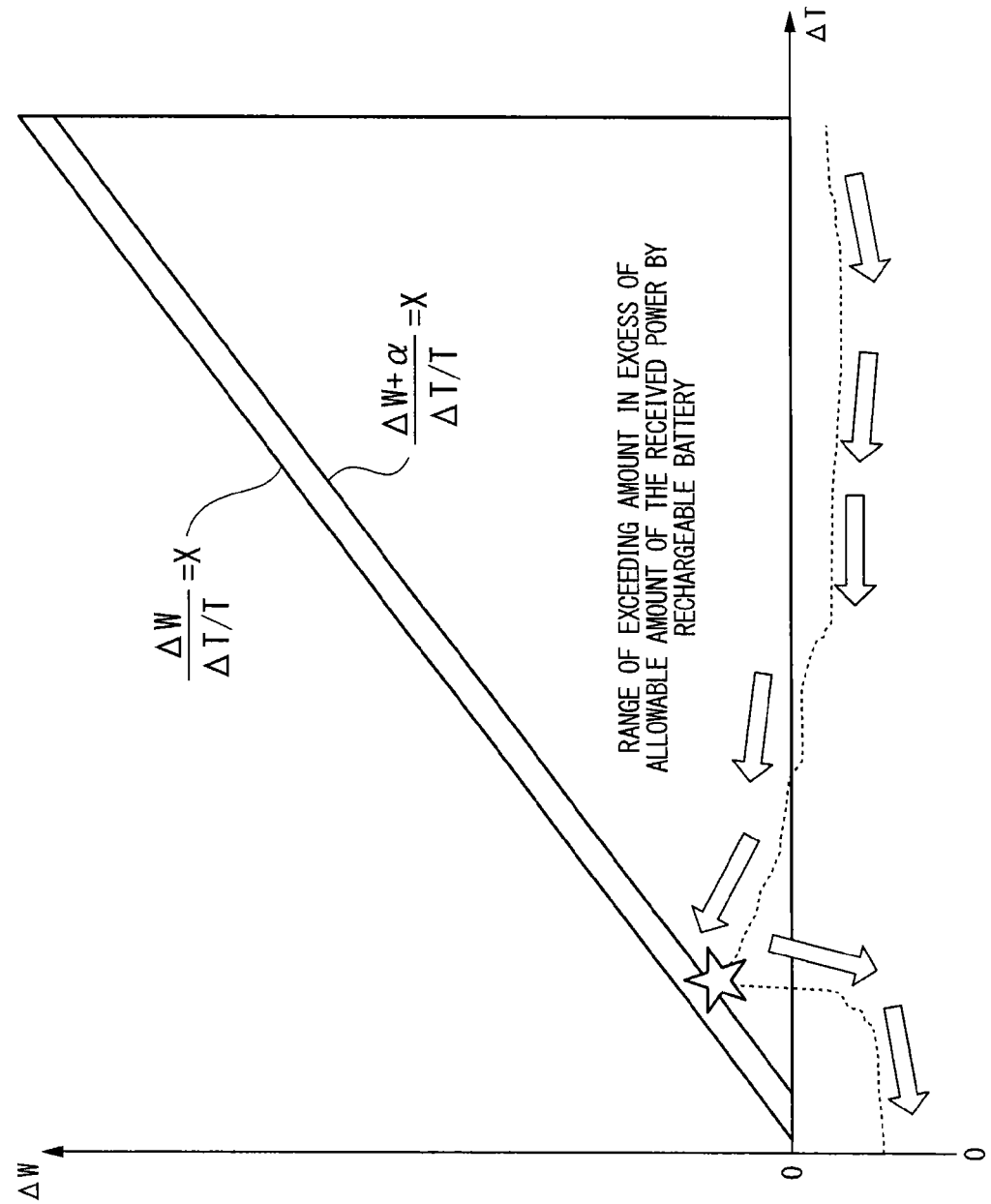
FIG. 11 shows the relationship between the time remaining and the amount exceeding the receive power amount in the second embodiment.

FIG. 11 shows the relationship between the remaining time and the excess value of the received power amount. The horizontal axis represents the remaining time ΔT, and the vertical axis represents the excess value ΔW of the received power amount relative to the limit value. The remaining time ΔT is larger, the closer is the last holding time, and smaller, the closer is the next holding time. As shown by Equation (4) and Equation (5), the smaller the remaining time ΔT is, the smaller is the excess value ΔW of the received power amount allowable by the rechargeable battery 20. Stated differently, the larger is the maximum power value X that can be output from the rechargeable battery, the greater is the ability of the battery to compensate the excess value ΔW of the received power amount relative to the limit value, even if the remaining time ΔT is small.

Described using the example of the pattern D shown in FIG. 10, the excess amount ΔW of the received power amount starts from a negative value and changes to a positive value when the limit value of the received power amount is exceeded. Additionally, the excess amount ΔW of the received power amount gradually increases, remaining as a positive value, and then decreases until it becomes a negative value, at the point at which the relationship shown in Equation (5) is satisfied. This is because, at the point at which the relationship shown in Equation (5) is satisfied, the rechargeable battery 20 is continuously discharged, based on a signal indicating the output value of the rechargeable battery. The excess value ΔW of the received power amount becomes a predetermined negative value at the remaining time of ΔT=0, that is, at the holding time.

In FIG. 11, the slope of the straight line determined by Equation (4) or by Equation (5) becomes larger as the maximum power value X that can be output from the rechargeable battery, increases. That is, the larger is the maximum power value X that can be output from the rechargeable battery, the more it is possible to compensate the excess amount ΔW of the received power amount relative to the limit value, even if the remaining time ΔT is small, this being an advantage relative to fluctuations in the power demand amount.

Figure 12:
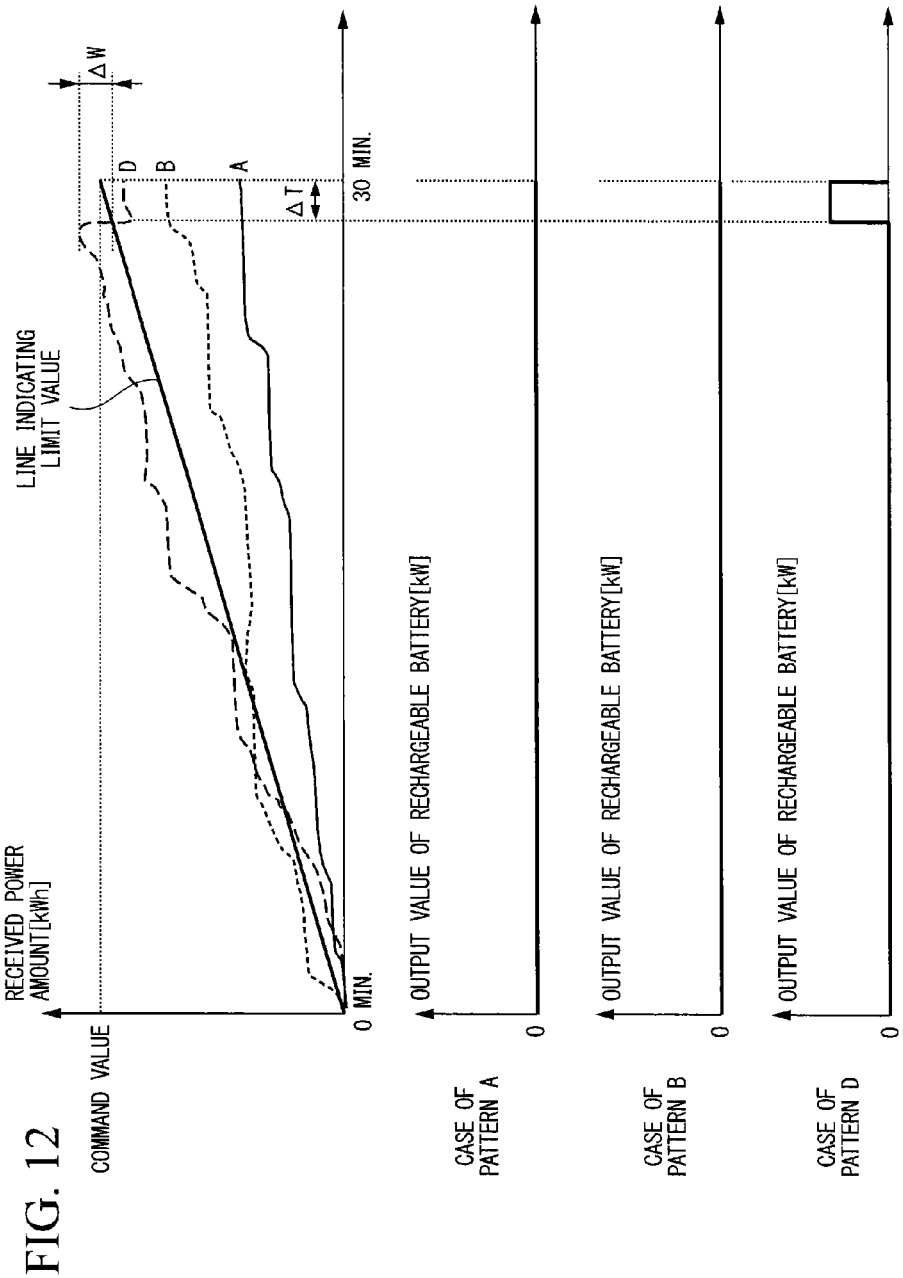
FIG. 12 shows the output of the rechargeable battery in the second embodiment.

FIG. 12 shows the output of the rechargeable battery 20. The topmost section shows the graph shown in FIG. 10. The lower section shows graphs indicating output value of the rechargeable battery for pattern A, pattern B, and pattern D, respectively. In the graphs indicating the output of the rechargeable battery, the horizontal axis represents time, and the vertical axis represents the output value (kW) of the rechargeable battery.

In pattern A, at the point at which the remaining time ΔT is reached, the relationship indicated by Equation (5) is not satisfied, and the received power amount supplied to the control target device 2 from the electrical power system falls below the limit value of the received power amount, so that the output value of the rechargeable battery 20 is zero at all times. That is, in pattern A, based on the signal indicating the output value of the rechargeable battery, the rechargeable battery is neither charged nor discharged. Pattern B is also the same. Because there is no "charging cost during the DR time period" (to be described later using FIG. 14), the electrical charging controller provides a cost advantage.

In contrast, in pattern D, at the point at which the remaining time ΔT is reached, the relationship indicated by Equation (5) is satisfied, and because the received power amount supplied to the control target device 2 from the electrical power system exceeds the limit value of the received power amount, the rechargeable battery 20 is continuously discharged at the point at which the remaining time ΔT is reached. Performing such control, in the pattern A, the pattern B, and the pattern D, the received power amount supplied to the control target device 2 from the electrical power system in the time period T satisfies the limit value of the received power amount at the least at the holding time.

Next, an example of the operating procedure in the charge and discharge in battery controller 300 will be described.

Figure 13:
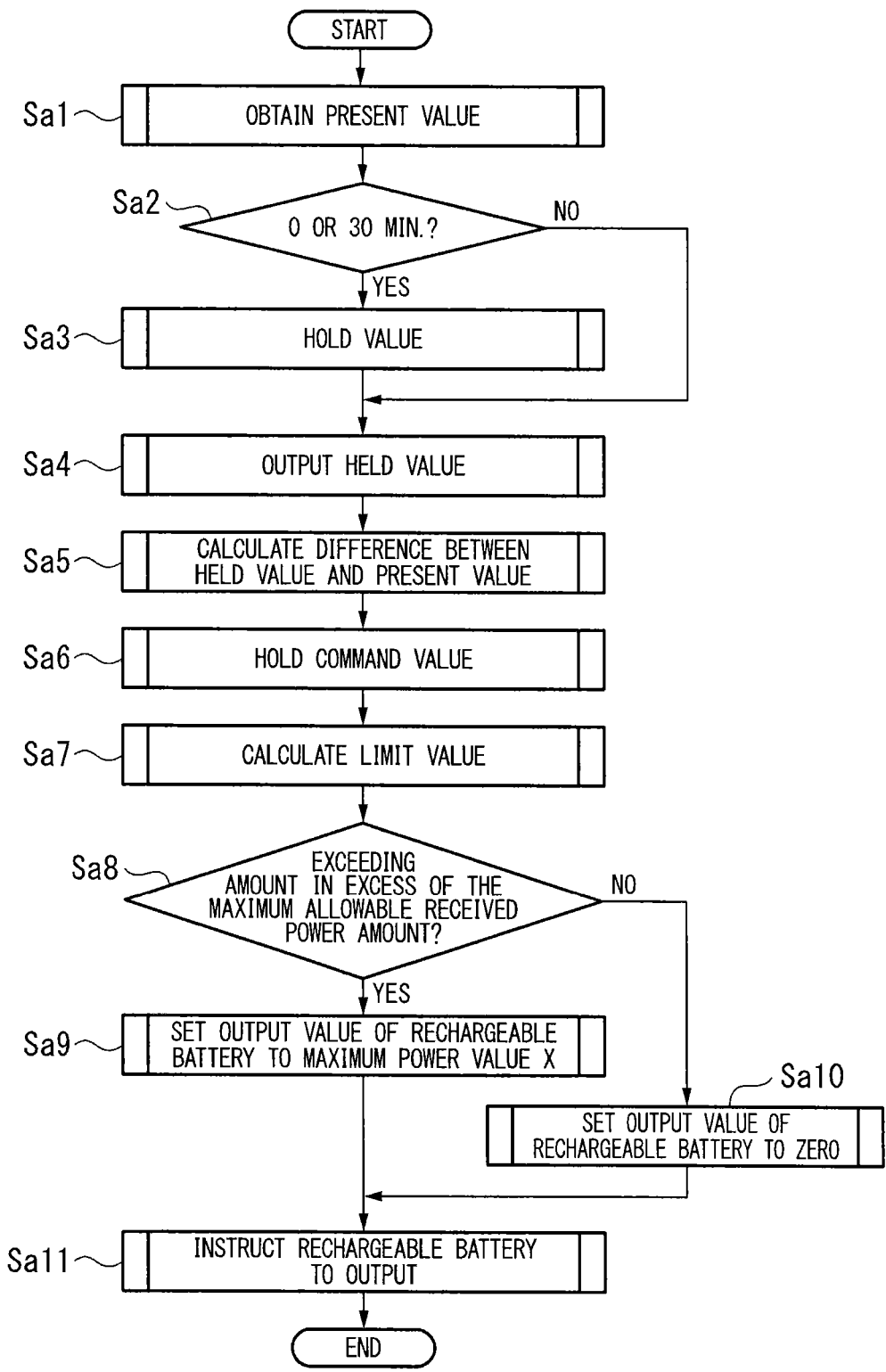
FIG. 13 is a flowchart showing the operation of the battery controller of the second embodiment.

FIG. 13 shows the operation of the battery controller 300.

Step Sa1 to step Sa7 are the same as the step S1 to step S7 shown in FIG. 8.

(Step Sa8) The rechargeable battery output command value generator 303 judges whether the excess amount ΔW of the received power amount relative to the limit value is at or above the maximum excess amount of the received power value allowable by the rechargeable battery 20, that is, whether or not the relationship indicated by the Equation (4) or Equation (5) is satisfied. If the excess amount ΔW of the received power amount relative to the limit value is at or greater than the maximum received power amount excess value allowable by the rechargeable battery 20 (step Sa8), the rechargeable battery output command value generator 303 proceeds to the processing of step Sa9. If, however, the excess value ΔW of the received power amount relative to the limit value is below the excess amount of the maximum received power allowable by the rechargeable battery 20 (step Sa8), the rechargeable battery output command value generator 303 proceeds to the processing of step Sa10.

(Step Sa9) The rechargeable battery output command value generator 303 establishes the output value of the rechargeable battery as the maximum power value X which is the value that can be output from the rechargeable battery.

(Step Sa10) The rechargeable battery output command value generator 303 establishes the output value of the rechargeable battery as zero.

(Step Sa11) The rechargeable battery output command value generator 303 outputs a signal indicating the output value of the rechargeable battery to the rechargeable battery 20 via the local controller 3 (communication system). If the output value of the rechargeable battery is established as being the maximum power value X, the rechargeable battery 20 discharges at the maximum power value X. If however, the output value of the rechargeable battery is established as the value 0, the rechargeable battery 20 neither charges nor discharges.

Figure 14:
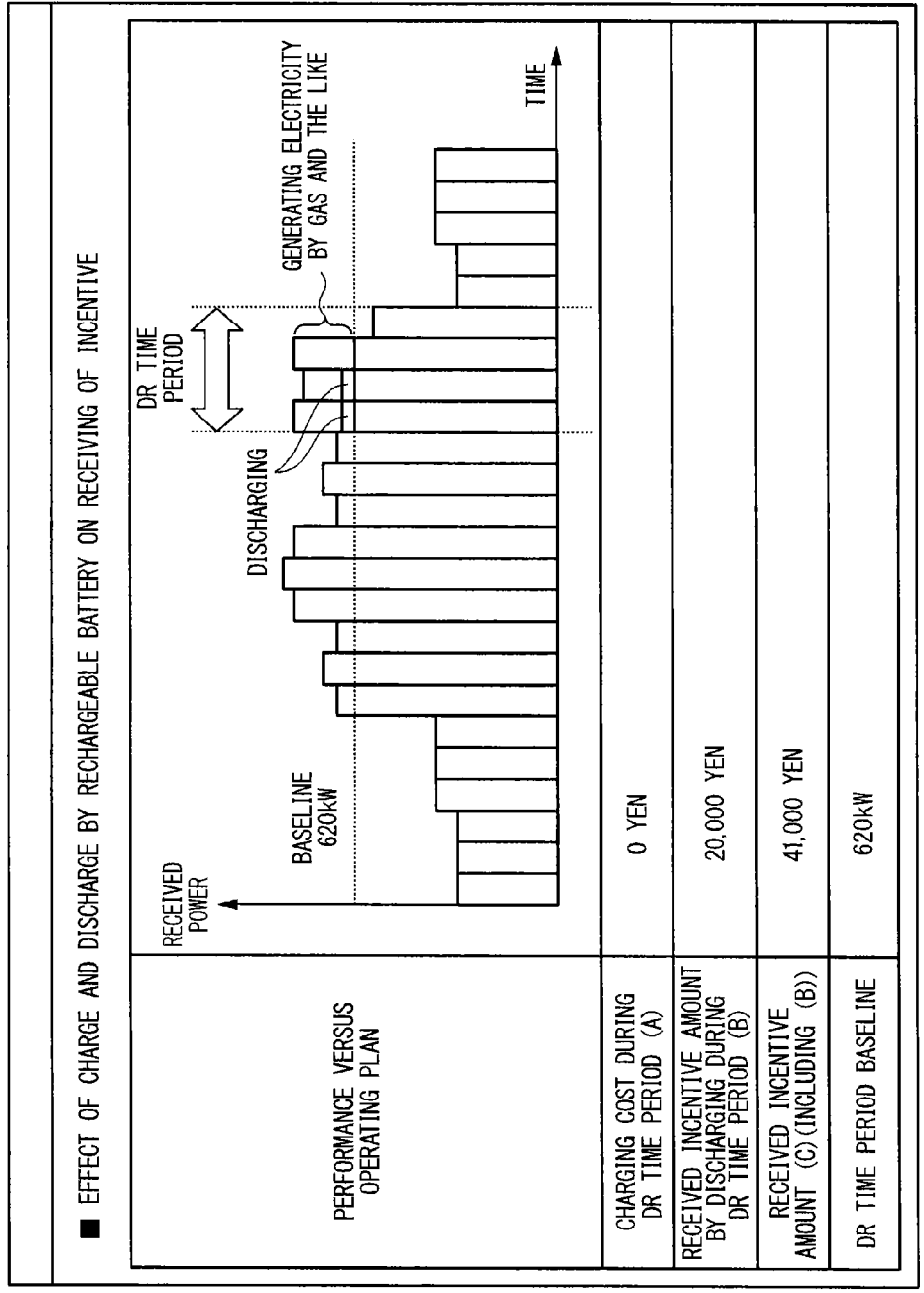
FIG. 14 shows, the effect of charge and discharge of electricity by the rechargeable battery on the receiving of an incentive in the second embodiment.

FIG. 14 shows the effect of the electrical charge and discharge by the rechargeable battery 20 on the receiving of an incentive. More specifically, FIG. 14 is an image for verifying the operating schedule (operating plan). This image may be displayed on the display 400 based on an image signal output from the approval 109.

In FIG. 14, in the first and second hours of the DR time period, the rechargeable battery 20 discharges. In the third hour of the DR time period, in contrast to the first embodiment, the rechargeable battery 20 neither charges nor discharges. In the fourth hour of the DR time period, the rechargeable battery 20 neither charges nor discharges. In FIG. 14, in the first, second, and third hours of the DR time period, the CGS 28 generates electricity by gas supplied from the gas system and generates electric power.

In contrast to the first embodiment, the item "Charging cost during DR time period" indicates that the cost required for charging the rechargeable battery 20 is "0 Yen". In this manner, the battery controller 300 of the second embodiment, compared with the First embodiment, can reduce the cost for charging during the DR time period, thereby increasing the cost advantage.

In this manner, if the received power amount supplied to the control target device 2 exceeding the limit value exceeds the electric power amount based on the maximum electric power X that can be output by the rechargeable battery 20, that is, if the received power amount allowable by the rechargeable battery 20 is exceeded, the controller in the second embodiment (for example, the rechargeable battery output command value generator 303) may perform collective control of the charge and discharge by the rechargeable battery 20 up until a predetermined time (the next holding time) (for example, refer to the lower part of FIG. 12).

By this constitution, the controller may perform collective control of the charge and discharge by the rechargeable battery 20 up until a predetermined time (holding time). This enables the battery controller 300, the management system 4, the battery control method, the battery control program, and the storage medium of the second embodiment to efficiently control the electric power supplied to the equipment at or above the command value of received power amount based on a demand response signal. The battery controller 300, the management system 4, the battery control method, the battery control program, and the storage medium of the second embodiment can achieve a further cost advantage.

The rechargeable battery output command value generator 303 of the second embodiment may output to the rechargeable battery 20 a signal indicating the output value of the rechargeable battery, based on the maximum electric power value X that the rechargeable battery 20 can output.

The rechargeable battery output command value generator 303 of the second embodiment may output to the rechargeable battery 20 a signal indicating the output value of the rechargeable battery, based on a value that is a margin value less than the maximum electric power value X that the rechargeable battery can output. The margin value can be established, for example, based on the discharge characteristics of the rechargeable battery 20. The margin value is a, for example, the electric power amount α shown in Equation (5) and FIG. 11.

Third Embodiment

In the third embodiment, the discharging of the rechargeable battery 20 so that the received power amount does not exceed the command value is the difference with respect to the second embodiment. In the following, only the differences with respect to the second embodiment will be described. In the third embodiment, the description assumes that the reverse current does not occur.

The received power meter 24 detects the received power amount supplied to the control target device 2 from the electrical power system over a predetermined time by accumulating a value of electric power supplied to the control target device 2 from the electrical power system over a predetermined time.

Figure 15:
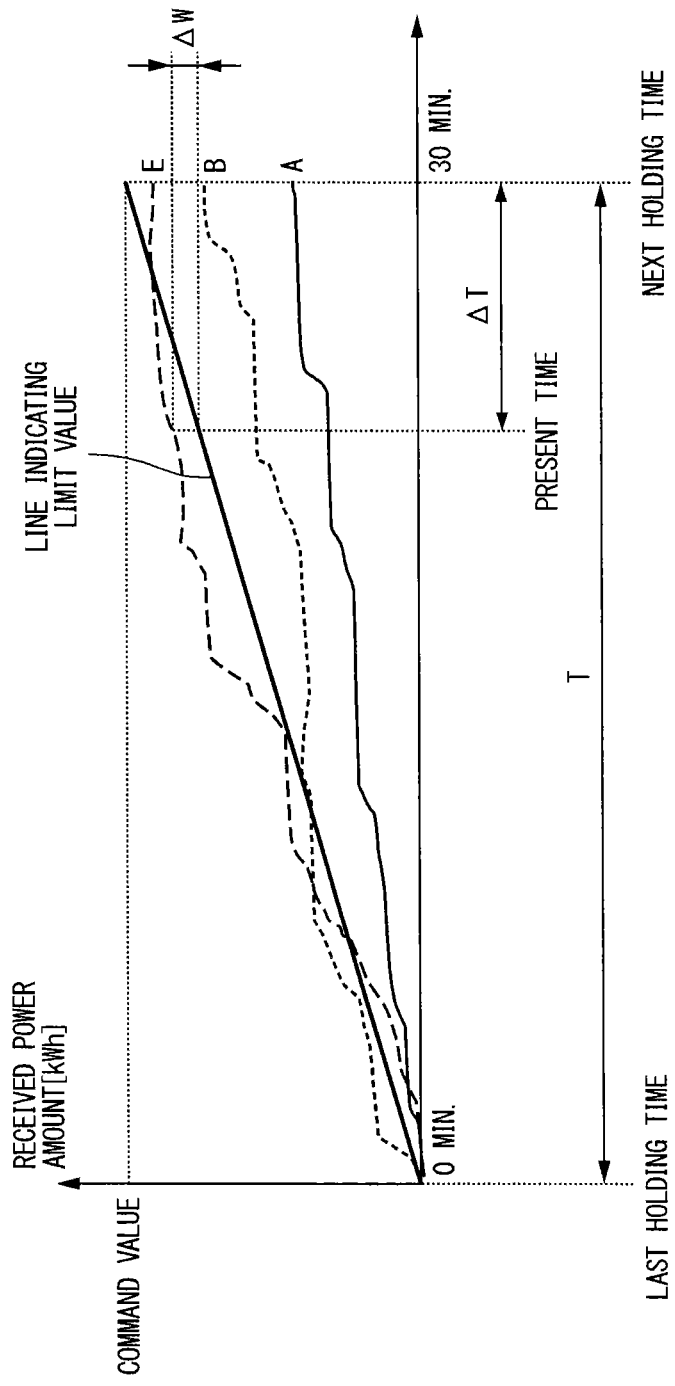
FIG. 15 shows the limit value of the received power amount in the third embodiment.

FIG. 15 shows the limit values of the received power amount, in which the horizontal axis represents time and the vertical axis represents the received power amount (kWh). The variation of the received power (kWh) supplied to the control target device 2 from the electrical power system from the last holding time until the present time are shown by the examples of pattern A, pattern B, and pattern E.

Pattern A and pattern B are the same as in FIG. 10. In pattern E, the receive power amount supplied to the control target device 2 from the electrical power system exceeds the received power amount limit value at first, but after reaching the remaining time of ΔT from the present time until the next holding time, falls below the received power amount limit value. This is because after reaching from the present time to the remaining time of ΔT until the next holding time, that is, at just before the next holding time, the rechargeable battery 20 is continuously discharged based on a signal indicating the output value of the rechargeable battery. The remaining time ΔT is long relative to the case shown in FIG. 12. In pattern E the received power amount not exceeding the command value is different from pattern D shown in FIG. 10.

Figure 16:
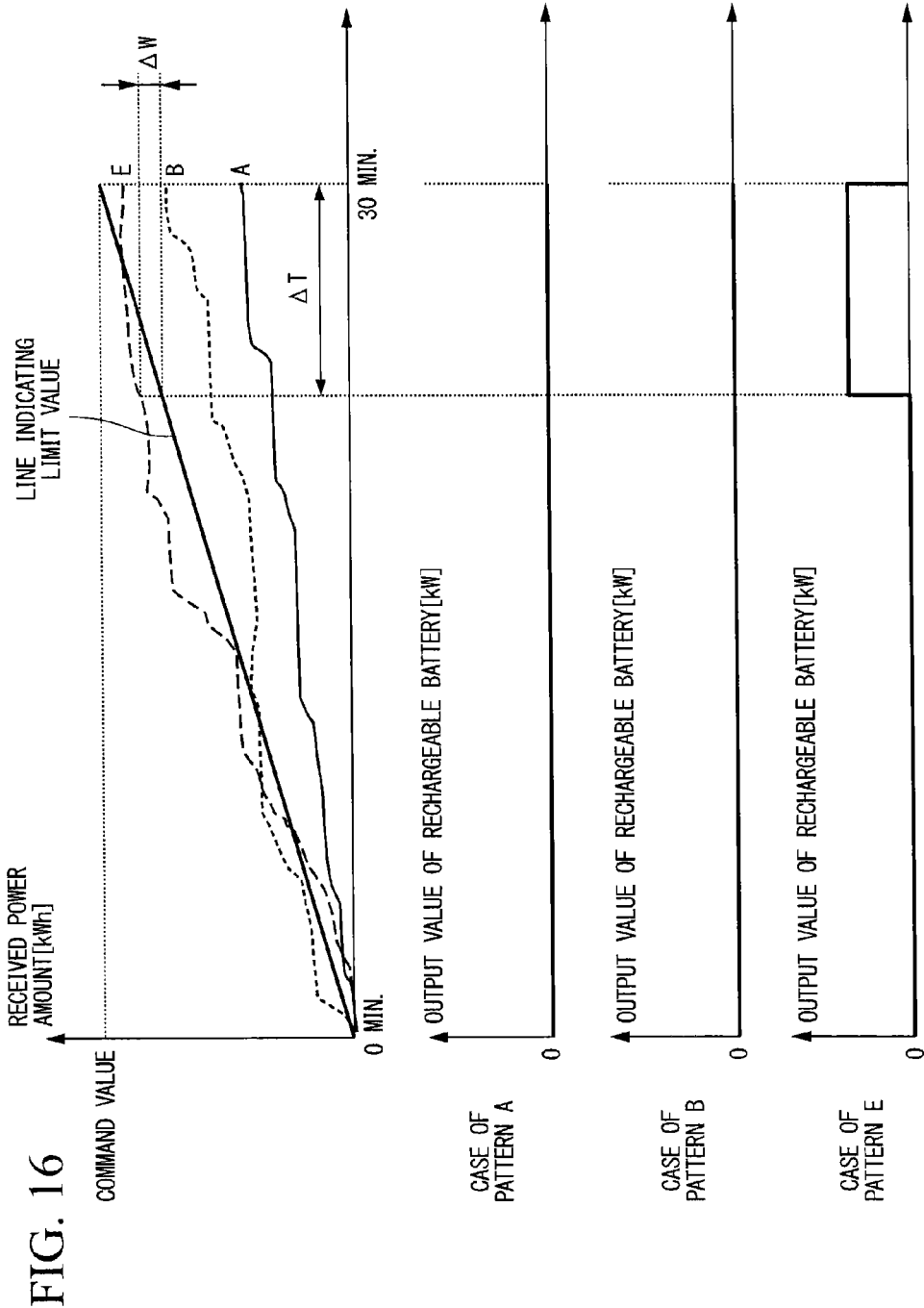
FIG. 16 shows the output of the rechargeable battery of the third embodiment.

FIG. 16 shows the output of the rechargeable battery 20. The topmost section shows the graph shown in FIG. 15. The lower section shows graphs indicating the output value of the rechargeable battery for pattern A, pattern B, and pattern E. In the graphs indicating the output of the rechargeable battery, the horizontal axis represents time, and the vertical axis represents the output value (kW) of the rechargeable battery.

In pattern A, at the point at which the remaining time ΔT is reached, the relationship indicated by Equation (5) is not satisfied, and the received power amount supplied to the control target device 2 from the electrical power system falls below the limit value of the received power amount, so that the output value of the rechargeable battery 20 is zero at all times. That is, in pattern A, the rechargeable battery 20 is neither charged nor discharged. Pattern B is the same. The result is that, because there is no "charging cost during the DR time period" the electrical charging controller 300 provides a cost advantage.

In pattern E, at the point of reaching the remaining time ΔT, which is longer than indicated in FIG. 12, the relationship indicated by Equation (5) is satisfied and, because the received power amount supplied to the control target device 2 from the electrical power system exceeds the received power amount limit value, the rechargeable battery 20 is continuously discharged when the remaining time ΔT is reached. As a result, in each of pattern A, pattern B, and pattern E, the received power amount supplied to the control target device 2 from the electrical power system in the time period T satisfies the limit value of the received power amount at least at the holding time.

According to a battery controller 300 of at least one of the above-described embodiments, by having a rechargeable battery output command value generator 303 that controls the electrical charge and discharge of the rechargeable battery 20 based on a difference calculated by the calculator 302 and a limit value of the received power amount, it is possible to efficiently control the electric power supplied to the equipment to at or above a command value of the received power amount, based on a demand response signal.

In the foregoing, although a number of embodiments of the present invention have been described, the embodiments have been presented as examples, these are not intended to restrict the scope of the present invention. These embodiments may take various other forms and, without exceeding the scope of the present invention, may be subjected to various omissions, replacements, and changes. These embodiments and variations thereof, just as they are encompassed in the scope and spirit of the present invention, are encompassed in the invention recited in the claims and equivalents thereto.

For example, a cloud server apparatus may constitute at least a part of the control system SY of the embodiments. That is, cloud computing may execute at least a part of the processing executed by the control system SY of the embodiments.

Cloud computing may include at least one of SaaS (software as a service) that provides applications (software) as a service, PaaS (platform as a service) that provides a platform for running applications as a service, and IaaS (infrastructure as a service) that provides resources such as a charge and discharge control apparatus, a central processing unit and storage as a service (public cloud). For example, cloud computing may include remote operation via a network by a cloud service providing layer (PaaS).

At least one of the monitoring, fault handling and operation of the control system SY of the embodiments may be performed by a consigned service. For example, an ASP (application service provider) may be consigned to perform monitoring of the control system SY, fault handling, and operation. Also, the monitoring, fault handling, and operation of the control system SY of the embodiments may be divided into a plurality of entities.

A program to implement the control system SY described above may be recorded in a computer-readable storage medium and the program recorded into the storage medium, read into a computer system, and executed thereby so as to perform processing. The "computer system" used herein may one that includes an operating system and hardware such as peripheral devices.

In the case of using the WWW system, "computer system" also includes a webpage-providing environment (or displaying environment). The "computer-readable storage medium" refers to a writable non-volatile memory such as a flexible disc, an opto-magnetic disk, a ROM, and a flash memory, a removable medium such as a CD-ROM, and a storage such as a hard disk drive built into a computer system.

Additionally, "computer-readable storage medium" includes one that holds a program for a certain period of time, such as a volatile memory (for example a DRAM (dynamic random-access memory)) within a computer that functions as a server or client in the case of transmitting a program via a network such as the Internet or a communication line such as a telephone line.

The above-noted program may be transferred from a computer system in which the program is stored in a storage device or the like to another computer system via a transfer medium or via a transfer wave in a transfer medium. The "transfer medium" that transfers the program refers to a network (communication network) such as the Internet or a medium having a function of transferring information, such as a communication circuit (communication line) such as a telephone line.

The above-noted program may be one for implementing a part of the above-described functionality. Additionally, it may be a so-called difference file (difference program) capable of implementing the above-noted functionality in combination with a program already recorded in a computer system.

The invention claimed is:

1. A battery controller comprising:
a holder configured to hold, at times in a predetermined time period defined by a predetermined time interval, values of an amount of a received power, the received power having been supplied from an electrical power receiving system to equipment that is to be supplied with a power from a rechargeable battery;
a first calculator configured to calculate a respective difference, at each of the times, between present values of the amount of the received power supplied from the electrical power system to equipment and last-held values of the amount of the received power last-held by the holder;
an acquirer configured to acquire a command value or planned value of the amount of the received power for the predetermined time period;
a second calculator configured to calculate limit values of the amount of the received power at the times having intervals that are shorter than the each predetermined time period, by using the command value or planned value as a limit value of the amount of the received power at an end of the predetermined time period; and
a controller configured to control charge and discharge of the rechargeable battery, based on the respective differences calculated by the first calculator and on the limit values of the amount of the received power calculated by the second calculator, wherein the controller outputs a signal indicating an output value of the rechargeable battery to the rechargeable battery, based on a value that is less by a margin value than a maximum output power value of the rechargeable battery.

2. A battery controller comprising:
a controller configured to control at least one of charge and discharge of a rechargeable battery, based at least in part on a difference between a present value of an amount of a received power supplied from an electrical power system to equipment and a last-held value of an amount of a received power, and based at least in part on a limit value of the amount of the received power, and
the controller configured to output a signal indicating an output value of the rechargeable battery to the rechargeable battery, based on a value that is less by a margin value than a maximum output power value of the rechargeable battery.

3. The battery controller according to claim 2, further comprising:
a holder configured to hold, at predetermined times, values of the amount of the received power, the received power having been supplied from the electrical power system to equipment that is to be supplied with a power from the rechargeable battery.

4. The battery controller according to claim 3, further comprising:
a first calculator configured to calculate the difference between the present value of the amount of the received power and the last-held value of the amount of the received power last-held by the holder at the predetermined time.

5. The battery controller according to claim 4, further comprising:
an acquirer configured to acquire a command value or planned value of the amount of the received power for each predetermined time period defined by a predetermined time interval; and
a second calculator configured to calculate the limit value of the amount of the received power for each time period that is shorter than the predetermined time period, by using the command value or planned value as a limit value of the amount of the received power at an end of the predetermined time period.

6. A battery controller comprising:

a first calculator configured to calculate limit values of the amount of the power at time intervals that are shorter than a predetermined time period, by using a respective command value or a respective planned value of the amount of the power for each of the predetermined time periods as a limit value of the amount of the power at an end of each of the predetermined time periods; and a controller configured to control, at the time intervals, at least one of charge and discharge of a rechargeable battery to suppress the power from exceeding either the command value or planned value, based at least in part on differences between present values of the amount of power supplied from an electrical power system to equipment and last-held values of the amount of power at the time intervals, and based at least in part on the limit values calculated by the first calculator.

7. The battery controller according to claim 6, further comprising:

a holder configured to hold, at the time intervals, values of the amount of the received power, the received power having been supplied from the electrical power system to equipment that is to be supplied with a power from the rechargeable battery.

8. The battery controller according to claim 7, further comprising:

a second calculator configured to calculate, at the time intervals, the differences between the present values of the amount of power supplied from the electrical power system to equipment and the last-held values of the amount of power.

9. The battery controller according to claim 8, further comprising:

an acquirer configured to acquire the command values or planned value of the amount of the received power for the predetermined time periods defined by predetermined time intervals.

* * * * *